United States Patent [19]

Watanabe et al.

[11] Patent Number: 4,896,234
[45] Date of Patent: Jan. 23, 1990

[54] MODE-CHANGE MECHANISM FOR TAPE RECORDING AND/OR REPRODUCING APPARATUS

[75] Inventors: Hisanori Watanabe, Kanagawa; Kenji Ohara, Chiba, both of Japan

[73] Assignee: Sony Corporation, Tokyo, Japan

[21] Appl. No.: 201,182

[22] Filed: Jun. 2, 1988

[30] Foreign Application Priority Data

Jun. 30, 1987 [JP] Japan .................................. 62-163353

[51] Int. Cl.⁴ ............................................. G11B 21/22
[52] U.S. Cl. .................................... 360/105; 360/96.3; 360/137
[58] Field of Search ............... 360/105, 137, 96.2–96.4

[56] References Cited

U.S. PATENT DOCUMENTS 4,649,440  3/1987  Mordant ........................... 360/105 X Primary Examiner—A. J. Heinz
Attorney, Agent, or Firm—Lewis H. Eslinger; Jay H. Maioli

[57] ABSTRACT

A mode-change mechanism for a tape recording and/or reproducing apparatus of the auto reverse type requires only one partially toothless gear with at least four, toothless peripheral portions in order to change modes of operation of the apparatus. The gear with the partially toothless peripheral portions is rotated only in one direction, and rotates in turn from each locked position to its next locked position in selecting the various modes of operation, so that a stop mode, a forward reproducing or recording mode, a reverse reproducing or recording mode, a fast forward mode, and a rewind mode are selectively obtained.

26 Claims, 23 Drawing Sheets

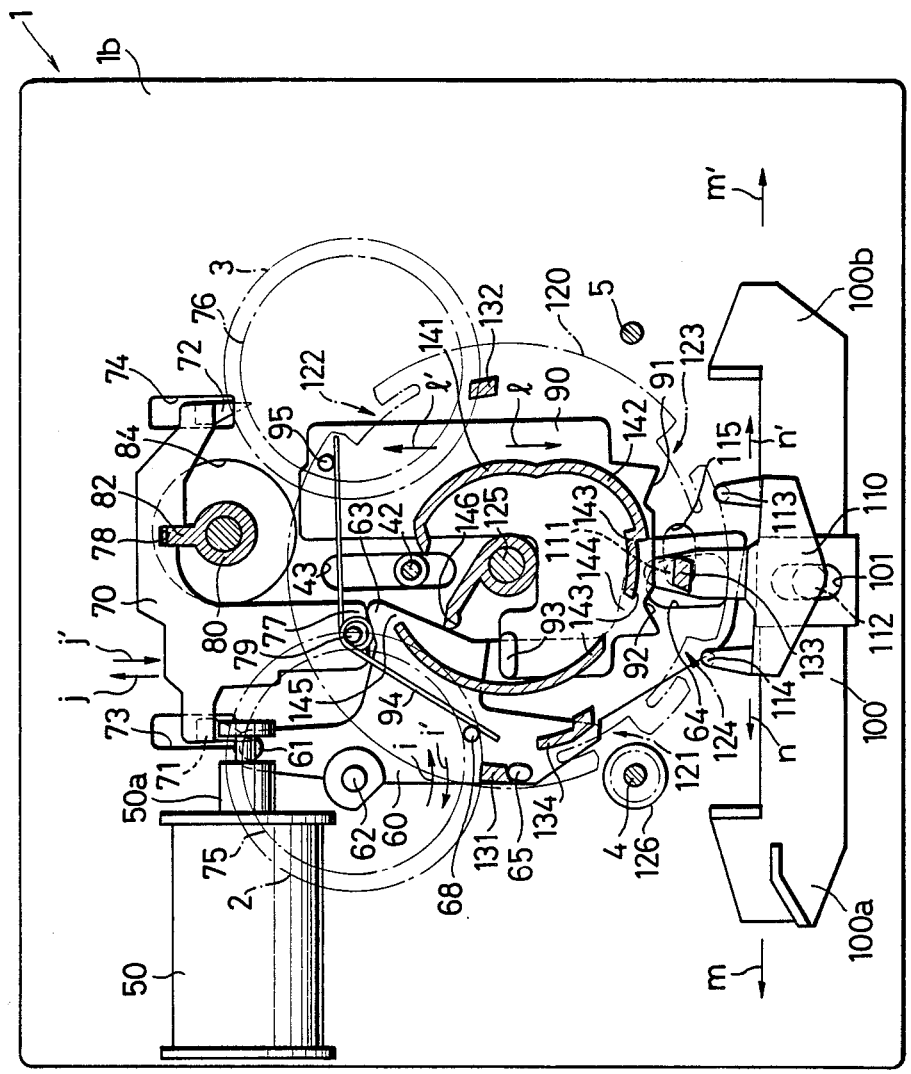

MODE-CHANGE MECHANISM FOR TAPE RECORDING AND/OR REPRODUCING APPARATUS

BACKGROUND OF THE INVENTION

1. Field of the Invention

This invention relates to a mode-change mechanism for a recording and/or reproducing apparatus in which various operating modes can be selected and, more particularly, to the mode-change mechanism for an auto-reverse tape recorder.

2. Description of the Background

In an auto-reverse tape recorder many different modes of operation, such as a reproducing or recording mode, a fast forward mode or the rewind mode in either the forward or reverse tape drive, or the stop mode can be selectively obtained by operation of a mode-change mechanism.

Such mode-change mechanism usually requires a plurality of partially toothless gears formed with selected peripheral portions not having any gear teeth and having respective cams formed thereon. For example, typically provided are a partially toothless gear with a cam for selecting the forward or reverse run of the tape, a partially toothless gear with a cam for providing the stop mode or the reproducing or recording mode, a partially toothless gear with a cam for providing the fast forward mode or the rewind mode, and a plurality of solenoids, which are provided in conjunction with the respective gears with toothless peripheral portions and by which the respective gears are selectively locked or unlocked in the positions where the toothless portions of the gears are located in opposed relation to a drive gear. Thus, by controlling the energization of each solenoid, each respective partially toothless gear and cam is intermittently rotated by the driving gear to enable the cam to move a lever, slider, or the like, so that desired operational mode is obtained.

Although the known system operates in a generally acceptable fashion, the number of parts required for the mode-change mechanism is very large and the construction of the mode-change mechanism very complicated in order to provide a partially toothless gear with a cam and a solenoid exclusively for each mode-change. As a result, the cost of the auto-reverse tape recorder is increased. Moreover, if the actions of the plurality of solenoids are a little out of order, that is, are not properly timed, the two modes may conflict with each other and, as a result, the tape recorder may be damaged considerably.

OBJECTS AND SUMMARY OF THE INVENTION

Accordingly, it is an object of the present invention to provide a mode-changing mechanism for an auto-reverse tape recorder that can eliminate the above-noted defects inherent in the prior art.

Another object of the present invention is to provide a mode-change mechanism for an auto-reverse recording and/or reproducing apparatus that comprises a partially toothless gear with selected toothless peripheral portions and having a number of cams formed thereon that rotates in only one direction, and only a single solenoid for selectively locking or unlocking the gear. The solenoid is selectively operated or energized even while the partially toothless gear rotates, so that various modes of the apparatus, such as a reproducing or recording mode, a fast forward mode or a rewind mode in either the forward or reverse tape drive, or a stop mode are selectively obtained.

Yet another object of the invention is to provide a mode-change mechanism for an auto-reverse recording and/or reproducing apparatus in which the known plurality of partially toothless gears with cams and corresponding plurality of solenoids are not required for the respective operating modes, in order to reduce the number of parts to a minimum and to render the manufacturing process simpler so that the cost of production is largely reduced.

A further object of the invention is to provide a mode-change mechanism for an auto-reverse tape recorder in which even if the action of the solenoid is a little out of order during a time when the mode is changed, an error such as two modes conflicting with each other will not occur. Thereby improving the soundness and reliability of the mode-changing operation.

A still further object of the present invention is to provide a mode-change mechanism for an auto-reverse recording and/or reproducing apparatus in which a single partially toothless gear with cams mounted thereon rotates not in both directions but only in one direction, so that a change-over mechanism or circuit for changing between the normal rotation and the reverse rotation of the gear is not necessary, thereby simplifying the construction of the gear.

A further object of the present invention is to provide a mode-change mechanism for an auto-reverse recording ad/or reproducing apparatus in which there are provided special functions, such as a fast forward search mode and are wind search mode, during which the tape is lightly in contact with a magnetic head without preparing any special mechanism.

According to an aspect of the present invention a mode-change mechanism for an auto-reverse tape recorder is provided that requires only a single so-called partially toothless gear. In such mechanism a motor rotates a drive gear that in turn rotates the partially toothless gear in only one direction. The partially toothless gear has at least four toothless peripheral portions including a first toothless portion that is to be adjacent the driving gear during a stop mode, a second toothless portion that will be in opposed relation to the driving gear during a forward record/playback mode and during a reverse record/playback mode, a third toothless portion that will be in opposed relation to the driving gear during a fast forward mode and a rewind mode, and a fourth toothless portion that will be located opposite the driving gear during the operation of the other of the fast forward and rewind modes. The partially toothless gear also has cams formed on a flat surface thereof, such as a cam for leading a movable head base, on which the tape recorder magnetic head is mounted, to a stop position where the head is separated from the magnetic tape, to a record/playback position where the head is in contact with the tape, and to a search position midway between the other two positions where the head is just barely in contact with the tape. A forward/reverse cam is also provided to lead a forward/reverse change lever to which is rotatably mounted an idler gear that transmits the torque from the drive motor to one of the reel bases of the tape recorder. The gear also includes a presser element for pressing a moyable forward/reverse changeover lever selectively located in a forward mode position or in a reverse mode position. A spring is provided to give an initial rotary torque to the partially toothless gear to move it when it is at rest with a toothless portion adjacent the driving gear. The locking device that locks the partially toothless gear from rotating is controlled by a single solenoid. This solenoid is controlled by a selection controller that also controls the selection lever that selects the modes of operation during which the driving gear is adjacent the toothless portions. By controlling the solenoid, the selection controller controls the selection lever while the partially toothless gear is being rotated.

The partially toothless gear also includes projecting elements that form part of the locking device for locking the partially toothless gear.

The above and other objects, features, and advantages of the present invention will become apparent from the following detailed description of an illustrative embodiment of the invention that is to be read in connection with the accompanying drawings, in which like reference numerals represent the same or similar elements.

BRIEF DESCRIPTION OF THE DRAWINGS

FIG. 8B is a bottom plan view in partial cross-section showing the principal elements of the mode-change mechanism of FIG. 8A;

DETAILED DESCRIPTION OF THE PREFERRED EMBODIMENT

Figure 1:
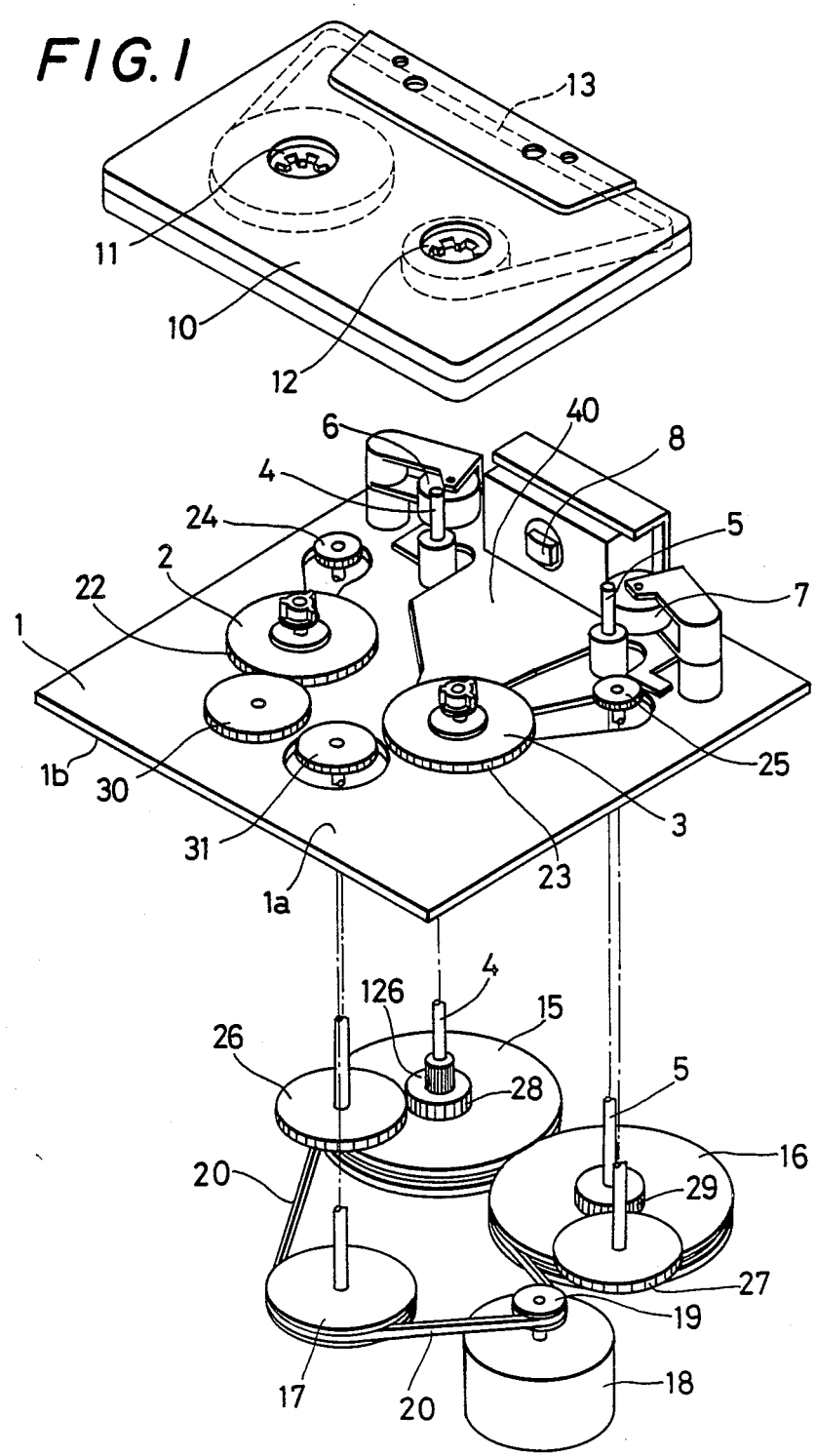
FIG. 1 is an exploded, perspective view of the tape drive system of an auto-reverse type recorder according to an embodiment of present invention.
Figure 2:
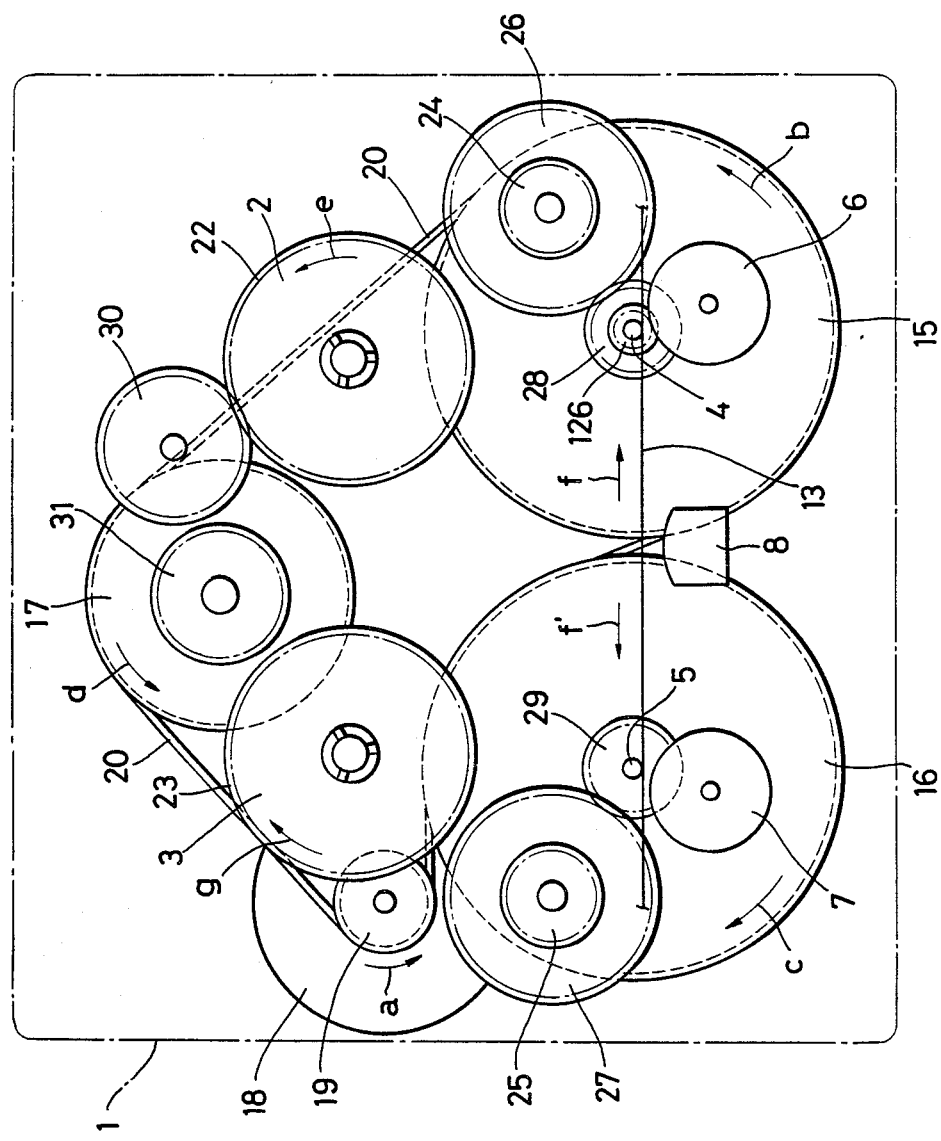
FIG. 2 top plan view of the tape drive system of FIG. 1.

FIGS. 1 and 2 show the tape drive system of an auto-reverse recorder that uses the well-known compact tape cartridge, in which a pair of left and right reel bases 2 and 3, capstans 4 and 5, pinch rollers 6 and 7, and a magnetic head 8 for recording and/or reproducing are provided on the upper side of a chassis 1. When a tape cartridge 10 is loaded on chassis 1, its reel hubs 11 and 12 are engaged with reel bases 2 and 3, respectively, and the magnetic tape 13 therein is looped between capstans 4 and 5 and comes in contact with magnetic head 8.

As shown in FIG. 2, capstan pulleys 15 and 16, which also serve as capstan flywheels, are fixed to the lower ends of capstans 4 and 5, respectively. A forward and reverse (FR) pulley 17 for fast-forwarding and rewinding and a motor 18, which provides the driving force for the tape recorder, are provided on a lower said 1b of chassis 1. An elastic belt 20 is looped among pulleys 15, 16, and 17 and a drive pulley 19 of motor 18. Reel base gears 22 and 23 are formed on the peripheries of the reel bases 2 and 3, respectively, and a forward (F) driver 24 for use in recording/reproducing in a forward direction and a reverse (R) driver 25 for use in recording/reproducing in a reverse direction are provided proximate the respective reel bases 2 and 3. Gears 26 and 27 are rotatable coaxially and formed integrally with F and R drivers 24 and 25, respectively, and are arranged beneath drivers 24 and 25 in the plane of FIG. 2. Gears 26 and 27 are always engaged with respective gears 28 and 29 that are coaxially attached to capstan pulleys 15 and 16, respectively.

An idler gear 30 is always engaged with reel base gear 23 of reel base 2, and a forward and reverse (FR) driver 31 for fast forwarding and rewinding is provided between idler gear 30 and reel base gear 23 of reel base 3. FR driver 31 is rotated coaxially and formed integrally with FR pulley 17 and is arranged thereunder in the plane of FIG. 2.

FIG. 2 represents a stop mode, in which if driving pulley 19 of motor 18 is rotated in a direction indicated by arrow a, capstan pulleys 15 and 16 and FR pulley 17 are driven by belt 20 in directions indicated by arrows b, c, and d, respectively. When a forward recording/reproducing mode is selected by the operation of a mode-change mechanism, which is described in detail hereinbelow, gear 26 is moved closer to the axis of rotation of reel base 2 as gear 26 becomes engaged with gear 28, and F driver 24, which is arranged on top of gear 6 in the plane of FIG. 2, is engaged with reel base gear 22 of reel base 2.

At the same time, magnetic head 8 is brought into contact with magnetic tape 13 and pinch roller 6 is pressed against capstan 4. As a result, reel base 2 is rotated in the direction indicated by arrow e, and the forward recording/reproducing mode is provided, in which magnetic tape 13 is driven in the direction indicated by arrow f, and forward recording/reproducing is performed through use of magnetic head 8.

When a reverse recording/reproducing mode is selected, gear 27 is moved closer to the axis of rotation of reel base 3 as gear 27 engages gear 29, and R driver 25, which is arranged on top of gear 27 in the plane of FIG. 2, is engaged with reel base gear 23 of reel base 3. At the same time, magnetic head 8 is brought into contact with magnetic tape 13, and pinch roller 7 is pressed against capstan 5, with the result that reel base 3 is rotated in the direction indicated by arrow g and the reverse recording/reproducing mode is provided. In such mode, magnetic tape 13 is driven in the direction indicated by arrow f' and reverse recording/reproducing is performed through use of magnetic head 8.

When a fast forward mode is selected, FR driver 31, which rotates integrally with FR pulley 17, engages idler gear 30, so that reel base 2 is rotated at high speed in the direction of arrow e. Thus, in the fast forward mode magnetic tape 13 is driven at high speed in the direction of arrow f.

When a rewind mode is selected, FR driver 31 is engaged with reel base gear 23, so that reel base 3 is rotated at high speed in the direction of arrow g. Thus, in the rewind mode magnetic tape 13 is driven at high speed in the direction of arrow f'.

In the tape recorder described above the fast forward and rewind modes may be selected from either of two different operating states. In addition, tape recorders of this kind also typically include the so-called search mode, in which fast forwarding or rewinding is performed while the magnetic head is only in light contact with the magnetic tape, in order to more quickly detect a recorded portion or a non-recorded portion between the recorded portions. Therefore, a fast-forward search mode or a rewind search mode can also be accommodated by the mode-change mechanism of the present invention.

Figure 5:
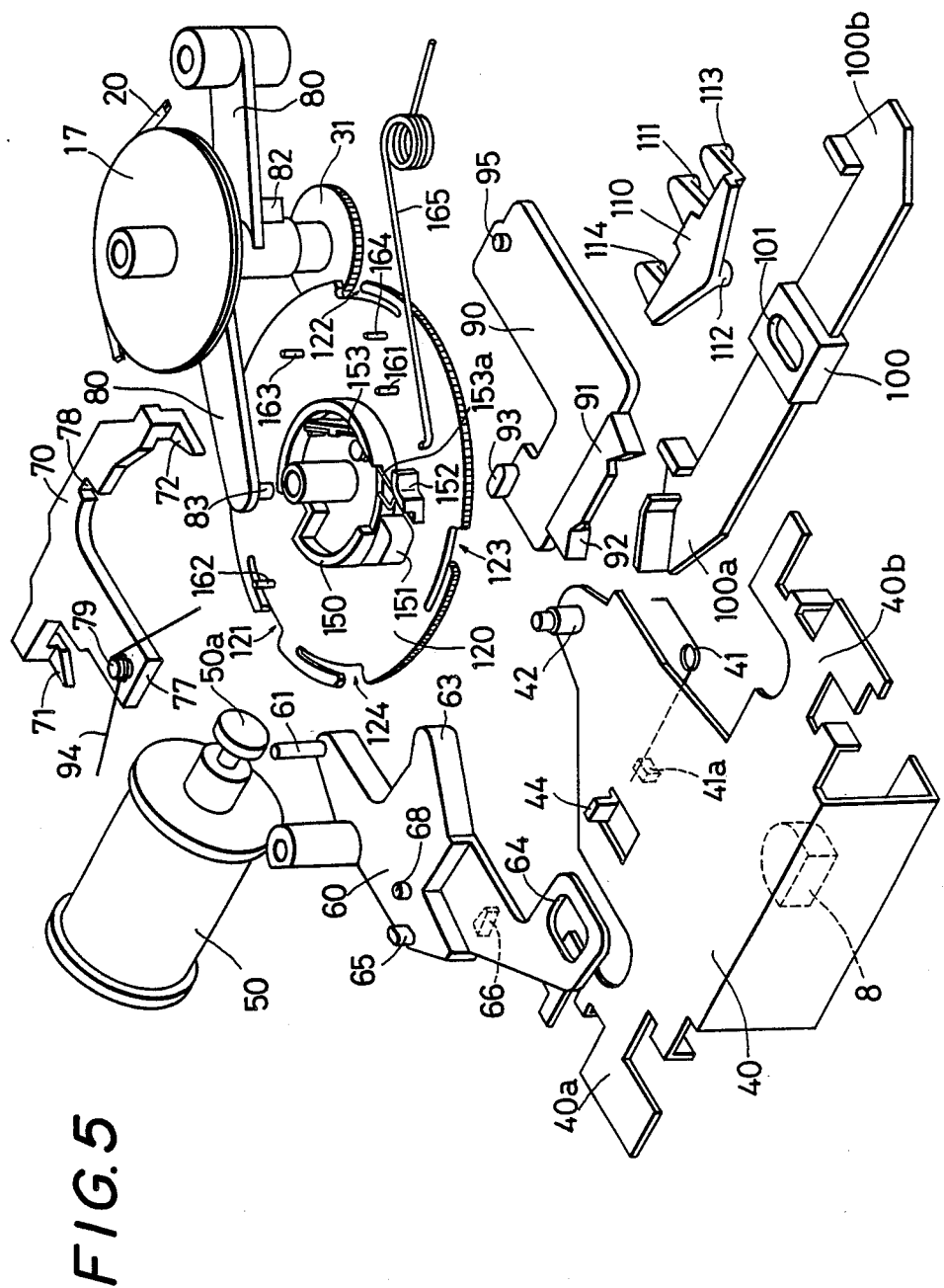
FIG. 5 is an exploded, bottom, perspective view of the mode-change mechanism of the auto-reverse tape recorder of FIG. 1.
Figure 7:
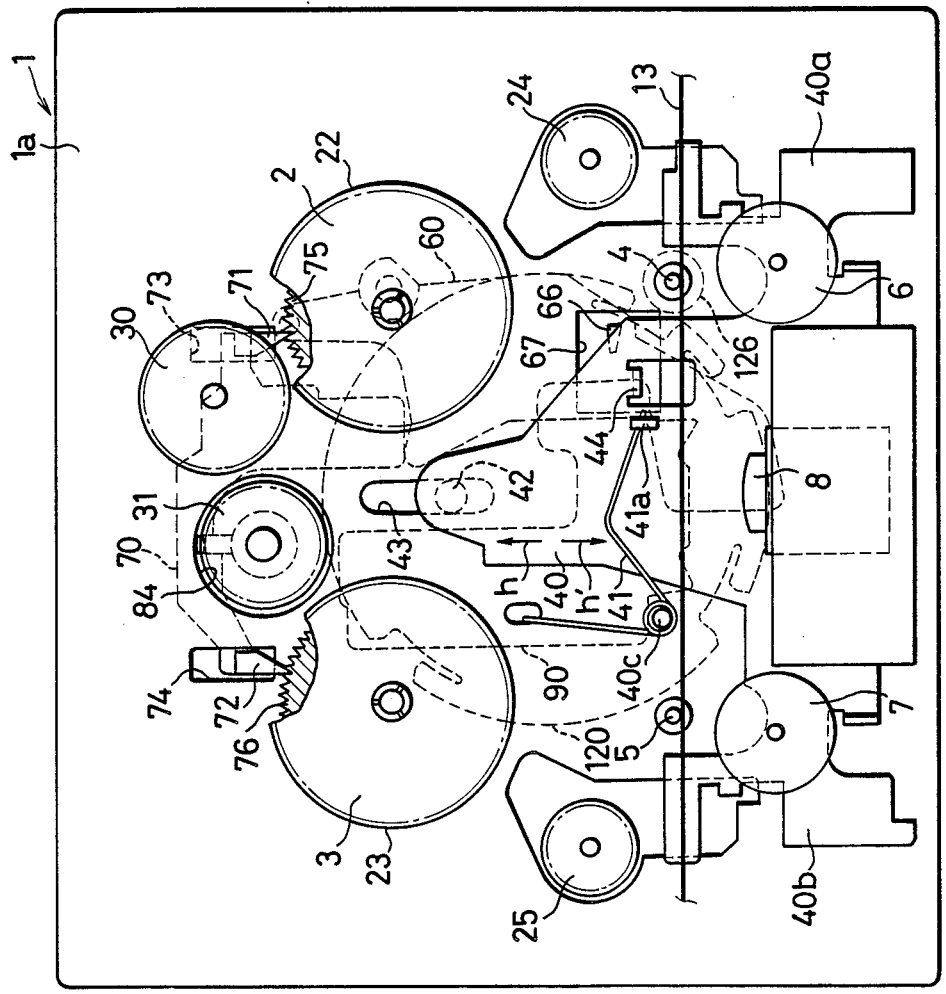
FIG. 7 is a top plan view showing the principal elements of the mode-change mechanism of FIG. 5 in the stop mode.

Referring to FIGS. 5 and 7, magnetic head 8 is turned through a predetermined angle in accordance with the driving direction of magnetic tape 13 and is mounted on a central portion of the rear end of a substantially T-shaped head baseplate 40. As shown in the top, plan view of FIG. 7, head baseplate 40 is mounted on the upper side 1a of chassis 1 for reciprocal movement in the directions indicated by arrows h and h' and is biased toward a return position, in the direction of arrow h', by a coiled torsion spring 41, one end of which is locked in a hole formed in chassis 1, the other end of which is locked by a locking piece 41a projecting from head baseplate 40, and a coiled portion of which is fitted over a pin 40c projecting from chassis 1. A pin 42 mounted on a lower surface of the front end of head baseplate 40 is inserted in a slot 43 formed in chassis 1 and projects downwardly therethrough. A downward projection 44 is formed in head baseplate 40 and is inserted in an aperture 67 formed in chassis 1.

As shown in FIGS. 5 and 8B, a solenoid 50 is mounted on lower side 1b of chassis 1, and pin 61 of a regulating lever 60 is engaged with a plunger 50a of solenoid 50. Regulating lever 60 is supported to pivot in the directions indicated by arrows i and i' by a shaft 62 protruding from chassis 1. A presser arm 63, an elongate aperture 64, and a locking projection 65, which projects downwardly, are all formed integrally with regulating lever 60. As shown in the bottom view of FIG. 5, a projection 66 projects upwardly and is formed integrally with regulating lever 60. When regulating lever 60 is moved to an advanced position in the direction of arrow i of FIG. 8B, projection 66 is located within aperture 67 (see FIG. 7) closer to a rear end of chassis 1 than projection 44 of head baseplate 40.

As shown in FIGS. 5 and 8B, a brake member 70 is mounted on lower side 1b of chassis 1 for reciprocal movement in the directions indicated by arrows j and j'. A pair of engagement portions 71 and 72 are formed integrally with left and right end portions of brake member 70, respectively. Engagement portions 71 and 72 are inserted in elongate apertures 73 and 74 formed in chassis 1, respectively, and project toward upper side 1a of chassis 1.

In FIG. 7, when brake member 70 is moved to a return position in the direction of arrow j', engagement portions 71 and 72 are engaged with teeth 75 and 76 formed on the lower flat surfaces of reel bases 2 and 3, respectively. A surface 77 of brake member 70 is pressed by presser arm 63 of regulating lever 60 and an engagement recess 78 is centrally formed on a side arm of brake member 70.

Figure 8A:
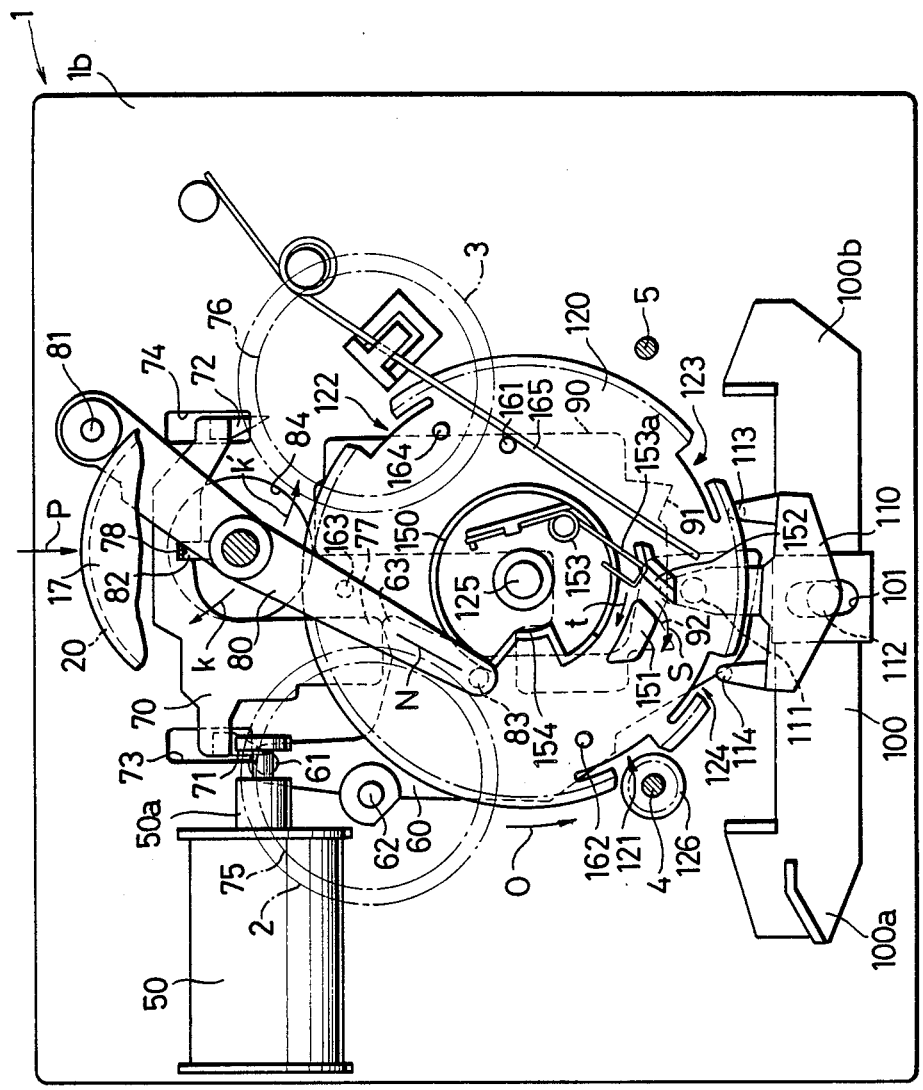
FIG. 8A is a bottom plan view showing the principal elements of the mode-change mechanism of FIG. 7.

FR change lever 80 for fast forwarding and rewinding is arranged beneath brake member 70 at lower end 1b of chassis 1, as shown in FIGS. 5 and 8A. FR change lever 80 rotatably supports FR pulley 17 that has FR driver 31 coaxially mounted therewith. FR change lever 80, which is pivotally supported at one end by a shaft 81 shown in FIG. 8A, can pivot in the directions indicated by arrows k and k'. In this case, since drive belt 20 is wound around FR pulley 17 of FR change lever 80, FR change lever 80 is urged in the direction of arrow k' by a force denoted generally as P generated by the elasticity of drive belt 20.

An engagement projection 82 is formed integrally with FR change lever 80 at a central portion thereof for engagement with engagement recess 78 of brake member 70. Thus, when engagement projection 82 is disengaged from engagement recess 78, FR change lever 80 is free to rotate in the directions of arrows k and k', and when engagement projection 82 is engaged with engagement recess 78 FR change lever 80 is held in a neutral position N, where FR driver 31 is not engaged with any adjacent gear. Note that a drive pin 83 projects upwardly and is formed integrally with the distal end of FR change lever 80, and that a circular aperture 84 is formed in chassis 1 for receiving driver 31.

In FIGS. 5 and 8B, a selectively actuated slider 90 is arranged on lower side 1b of chassis 1 for reciprocal movement in the directions indicated by arrows l and l'. A pair of left and right presser surfaces 91 and 92 and a downward projection 93 are formed integrally with slider 90. Regulating lever 60, brake member 70, and slider 90 are biased to return positions in the directions of respective arrows i', j', and l', by a coiled torsion spring 94, the coiled portion of which is wound around a pin 79 formed on brake member 70. One end of spring 94 is engaged with a spring stop 68 on regulating lever 60 and the other end of spring 94 is engaged with a spring stop 95 on slider 90. A changeover slider 100 is mounted at a rear end of lower side 1b of chassis 1 for slidable movement between a forward position in a direction indicated by arrow m and a reverse position in a direction indicated by arrow m'. When changeover slider 100 is slid in one of the two directions m and m', magnetic head 8 is selectively turned by the predetermined angle, and F driver 25 and pinch roller 6, or R driver 25 and pinch roller 7 are selectively restrained by the respective end 100a or 100b of changeover slider 100.

A slot 101 is formed in a central portion of changeover slider 100, and a changeover member 110 is mounted between changeover slider 100 and regulating lever 60. A fulcrum pin 111 projecting toward upper side 1a of chassis 1, a fulcrum pin 112 projecting in the same direction as fulcrum pin 111, and a pair of left and right pressing portions 113 and 114 are formed integrally with changeover member 110. More specifically, fulcrum pin 111 is inserted in elongated hole 64 of regulating lever 60 and then inserted in an elongate aperture 115 of chassis 1, and fulcrum pin 112 is inserted in elongate hole 101 of changeover slider 100, so that changeover member 110 can pivoted about either fulcrum pin 111 or fulcrum pin 112 in directions indicated by arrows n and n', respectively. Pressing portions 113 and 114 of changeover member 110 are selectively engaged with pressers 91 and 92 of selective slider 90.

As shown in FIGS. 5 and 8A, a gear 120 that has peripheral portions that are toothless and includes cams formed thereon is rotatably supported by a shaft 125 projecting from chassis 1 at lower side 1b and substantially at the center thereof in a position lower than regulating lever 60 and selective slider 90. A first, a second, a third, and a fourth toothless peripheral portions 121, 122, 123, and 124 are formed in turn around the periphery of gear 120. Gear 120 is intermittently rotated in a direction indicated by arrow o in FIG. 8A by a driving gear 126, which is formed coaxially and integrally with capstan pulley 15, shown in FIG. 1.

Figure 6:
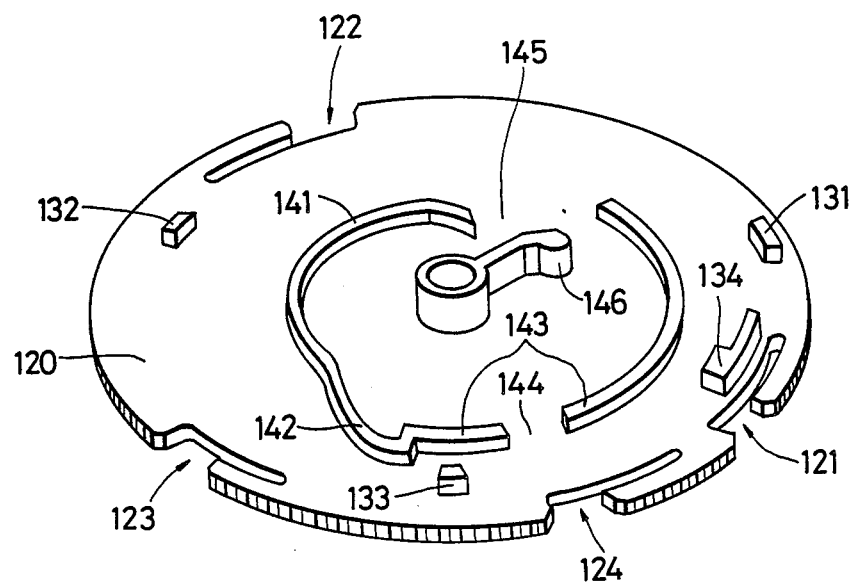
FIG. 6 is a perspective view of a gear having partially toothless peripheral portions and cams formed thereon used in the mode-change mechanism of FIG. 5.

As shown in FIGS. 6 and 8B, a first, a second, a third, and a fourth locking projections 131, 132, 133, and 134 are formed on gear 120 near the periphery thereof and on the upper, flat surface that faces the lower surface of chassis 1, and one of the locking projections selectively abuts locking projection 65 of regulating lever 60. On the upper surface of gear 120 there is a cam formed for driving drive pin 42 of head baseplate 40, which cam comprises a first cam portion 141 having a constant radius, a second cam portion 142 following first cam portion 141 and having a gradually increasing radius, and a third cam portion 143 following second cam portion 142 and having a constant radius a little smaller than that at the conclusion of second cam portion 142. A gap 144 is formed in third cam portion 143 and a gap 145 is formed between the third and first cam portions 143 and 141. Further, a projecting portion 146 for pressing projection 93 of selective slider 90 is formed integrally with the gear 120 near the center and on the upper surface thereof. Projecting portion 146 projects a little higher above the flat surface of gear 120 than cam portions 141, 142, and 143, as shown in FIG. 6.

FIGS. 5 and 8A show that a cam 150 for driving pin 83 of FR change lever 80 is also formed integrally with gear 120 on the lower surface thereof. In addition, a cam protrusion 151, which provides the fast forward mode, and a cam projection 152 adjacent cam protrusion 151 are both formed near the cam profile of cam 150 on the bottom surface of gear 120. These three cams 150, 152, 153 combine to form a first cam passageway S, formed between cam protrusion 151 and cam projection 152, and a second cam passageway t is formed between the cam protrusion 151 and cam 150.

A coiled torsion spring 153 is fixed at its one end to gear 120 at the inner side of cam 150, that is, at the side near the center of partially toothless gear 120, and the free end 153a of spring 153 protrudes over cam 150 to the location where the two passageways or grooves S and t branch. A recess 154, which is employed in the rewind mode, forms a part of the cam profile of cam 150.

A first, second, third, and fourth pin 161, 162, and 163, and 164 are formed integrally with gear 120 along with the cams on the lower surface thereof. Pins 161, 162, 163, and 164 are selectively engaged by an arm of a coiled torsion spring 165 mounted on chassis 1, so as to provide an initial torque, acting in the direction of arrow o, to gear 120.

In the stop mode, with reference to FIGS. 3, 4, and 7, to 8B, solenoid 50 is turned off and the plunger 50a is in its state of furthest extension. As shown in FIG. 8B, regulating lever 60 is moved to a return position in the direction of arrow i', and first locking projection 131 of gear 120 abuts locking projection 65 of regulating lever 60, so that gear 120 having the cams integrally formed therewith is locked in the state in which first toothless peripheral portion 121 is in opposed relation to drive gear 126. Since regulating lever 60 is moved to the return position, brake member 70 is moved to a return position in the direction of arrow j'. Therefore, as shown in FIG. 7, engagement portions 71 and 72 are engaged with teeth 75 and 76 of reel bases 2 and 3, respectively, so that rotation of reel bases 2 and 3 is restrained.

Figure 3:
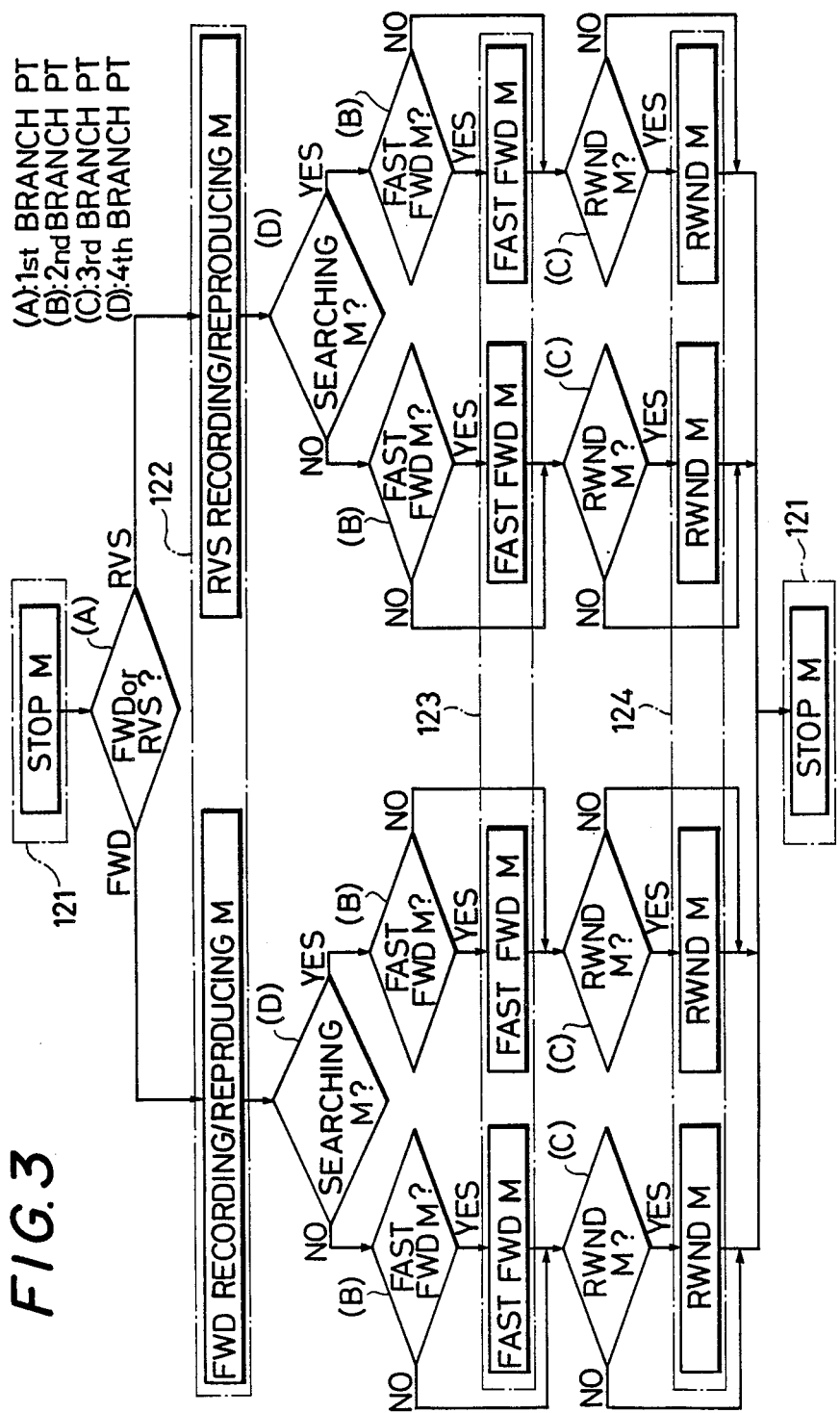
FIG. 3 is a flow chart representing the steps to be performed in a mode-changing operation.
Figure 4:
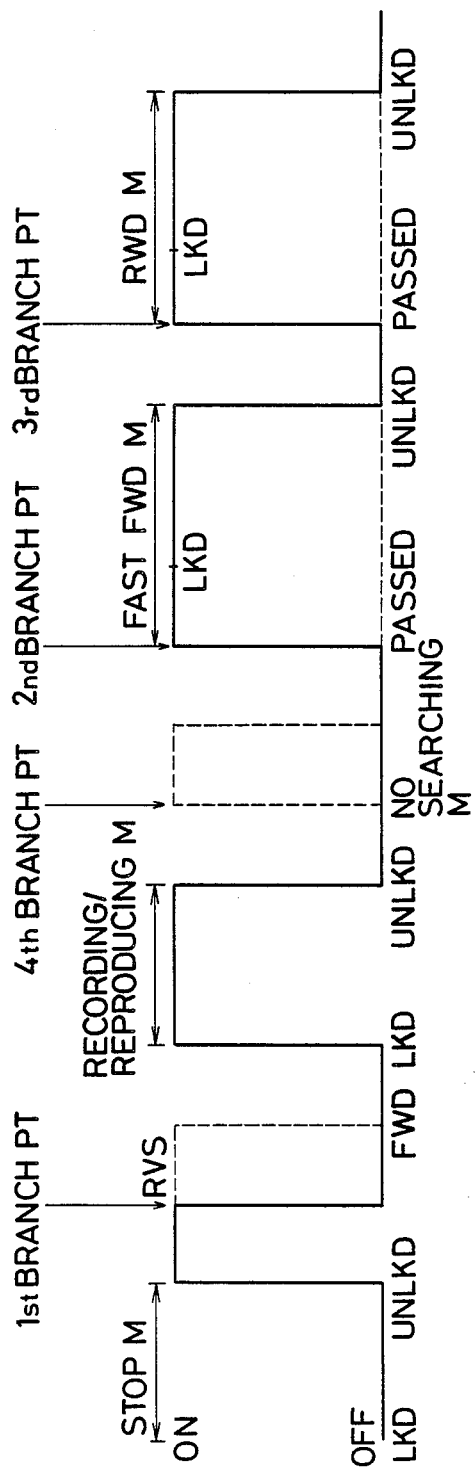
FIG. 4 is a timing chart of the steps of the mode-changing operation relative to the on-off operation of a solenoid employed in the mode changing mechanism.

As shown in FIG. 8A, because engagement recess 78 of brake member 70 is engaged with engagement projection 82 of FR change lever 80, FR change lever 80 is held in the neutral position N. Therefore, as shown in FIG. 7, FR driver 31 is spaced apart from both idler gear 30 and reel base gear 23. Head baseplate 40 is moved to a return position in the direction of arrow h' and drive pin 42 is located at gap 145 of the cam formed on gear 120, as shown FIG. 8B. As shown in FIG. 7, because head baseplate 40 is moved to the return position, magnetic head 8 is completely separated from magnetic tape 13, and F driver 24, R driver 25, and pinch rollers 6 and 7 are also moved to the return positions. In FIG. 8B, slider 90 is also moved to the return position in the direction of arrow l', in which the stop mode shown in FIGS. 3 and 4 is provided. Note that in a pause mode, the state is the same as that of the stop mode.

Referring to FIGS. 3, 4, and 8A to 10, the operation to be performed in selecting the "forward" or "reverse" modes will be described.

First, when a command to change to a recording/reproducing mode is present, solenoid 50 is energized and plunger 50a is withdrawn to its position of least extension. In FIG. 8B, regulating lever 60 is moved to the advanced position in the direction of arrow i and locking projection 65 is unlocked from first locking projection 131 of gear 120, which also includes the cams as described above.

Therefore, as shown in FIG. 8A, first spring stop 161 of gear 120 is pressed by the arm of coiled torsion spring 165, and an initial torque in the direction of arrow o is applied to gear 120. As a result, gear 120 is engaged with the driving gear 126 and rotated in the direction of arrow o.

Figure 9A:
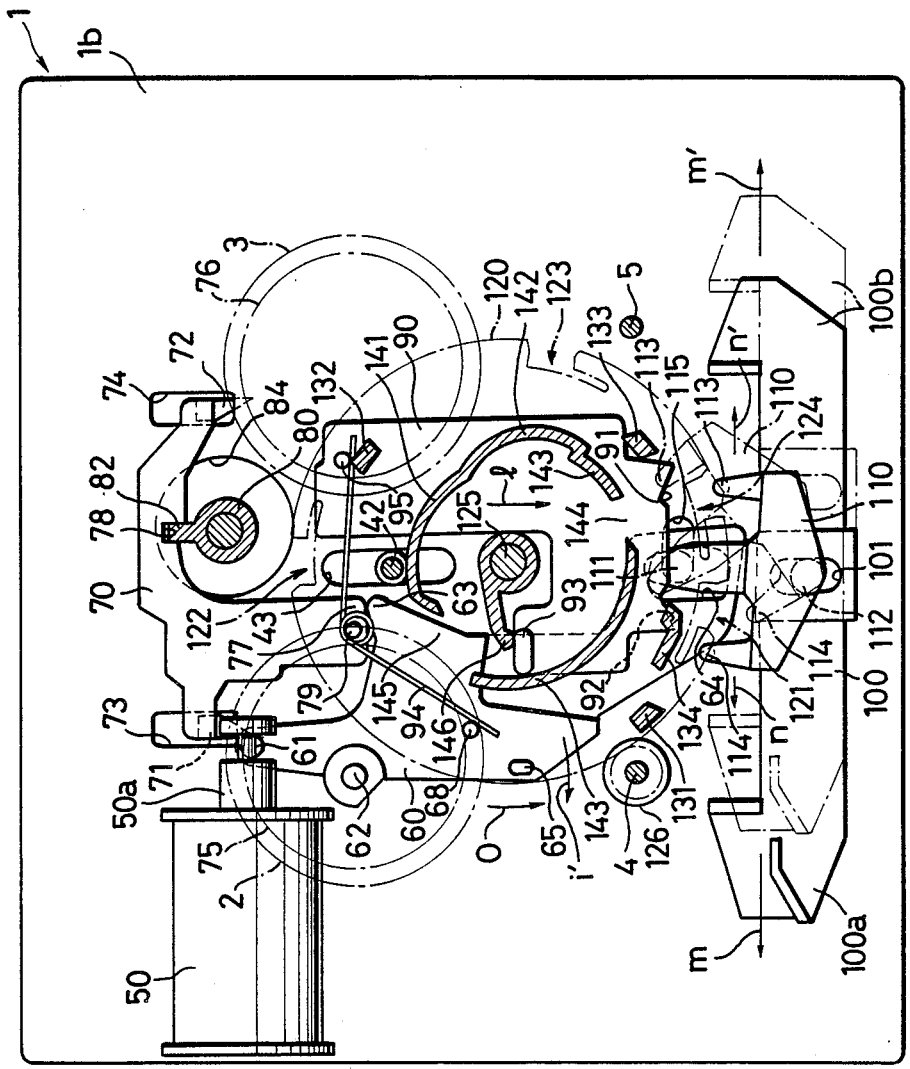
FIG. 9A is a bottom plan view in partial cross-section showing the principal elements of the mode-change mechanism of FIG. 5 at a time when a forward drive of the tape is selected.

A first branch point A where "forward" or "reverse" is selected by turning "on" or "off" solenoid 50, as shown in FIGS. 3 and 4, is provided after locking projection 65 is unlocked from first locking projection 131. Therefore, if "forward" is commanded, solenoid 50 is immediately turned "off" after unlocking, which was caused by the "on" state thereof. As a result, as shown in FIG. 9A, regulating lever 60 is moved to the return position in the direction of arrow i', so that changeover member 110 is pivoted about fulcrum pin 112 in the direction of arrow n due to the function of elongate aperture 64 of regulating lever 60.

In this case, because gear 120 has been rotated in the direction of arrow o, projected portion 146 of gear 120 presses projection 93 of slider 90, so that selective slider 90 is moved to an advanced position in the direction of arrow l. Therefore, if changeover slider 100 is located in a forward position in the direction of arrow m from the beginning, as indicated by the solid lines in FIG. 9A, changeover member 110 is not operated by slider 90, and changeover slider 100 is kept in the forward position.

On the contrary, if changeover slider 100 is located in a reverse position in the direction of arrow m', as indicated by alternate long and dashed lines, presser portion 113 of changeover member 110 is pressed by presser 91 of slider 90. Therefore, changeover member 110 is pivoted about fulcrum pin 111 in the direction of arrow n, and changeover slider 100 is moved in the direction of arrow m by fulcrum pin 112. As a result, changeover slider 100 is located at the forward position. That is, in either case, changeover slider 100 is located in the forward position.

Figure 9B:
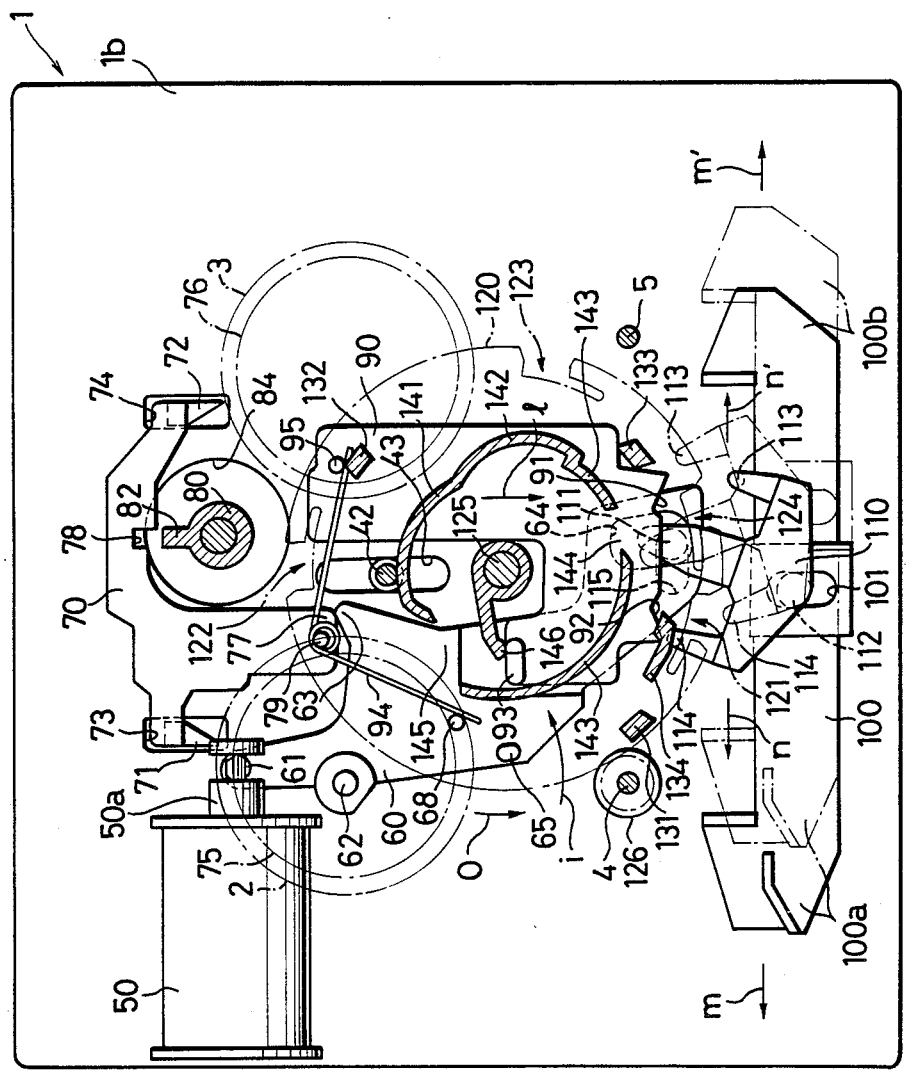
FIG. 9B is a bottom plan view in partial cross-section showing the principal elements of the mode-change mechanism of FIG. 9A at a time when a reverse drive of the tape is selected.

Next, if "reverse" is commanded at the first branch point A of the flow chart of FIG. 3, regulating lever 60 is kept in the advanced position in the direction of arrow i, as shown in FIG. 9B, because solenoid 50 has been kept "on" subsequent to being turned "on" at the time of unlocking. Therefore, as shown in FIG. 9B, changeover member 110 is kept in a state pivoted in the direction of arrow n' about fulcrum pin 112 due to the function of elongate aperture 64 of regulating lever 60. In addition, similar to the above case of "forward" being commanded, the selective slider 90 has been moved to the advanced position in the direction of arrow by the rotating partially toothless gear 120.

Therefore, if changeover slider 100 is located in the reverse position in the direction of arrow m', as indicated by alternate long and dashed lines, the changeover lever 119 is not operated, and the changeover slider 100 is kept in the reverse position.

On the contrary, when changeover slider 100 is located in the forward position in the direction of arrow m, as indicated by solid lines, presser portion 114 of changeover member 110 is pressed by presser 92 of slider 90. Therefore, changeover member 110 is pivoted about fulcrum pin 112 in the direction of arrow n', and changeover slider 100 is moved to the reverse position in the direction of arrow m' by fulcrum pin 112. Thus, in either case, changeover slider 100 is located in the reverse position.

As described above, by turning solenoid 50 "on" or "off" at the first branch point A in the flow chart of FIG. 3, upon rotation of the partially toothless gear 120 and by action of its cams, "forward" or "reverse" is provided. During this selection, driven pin 42 of the head baseplate 40 is led by first cam 141 formed on gear 120.

Figure 10:
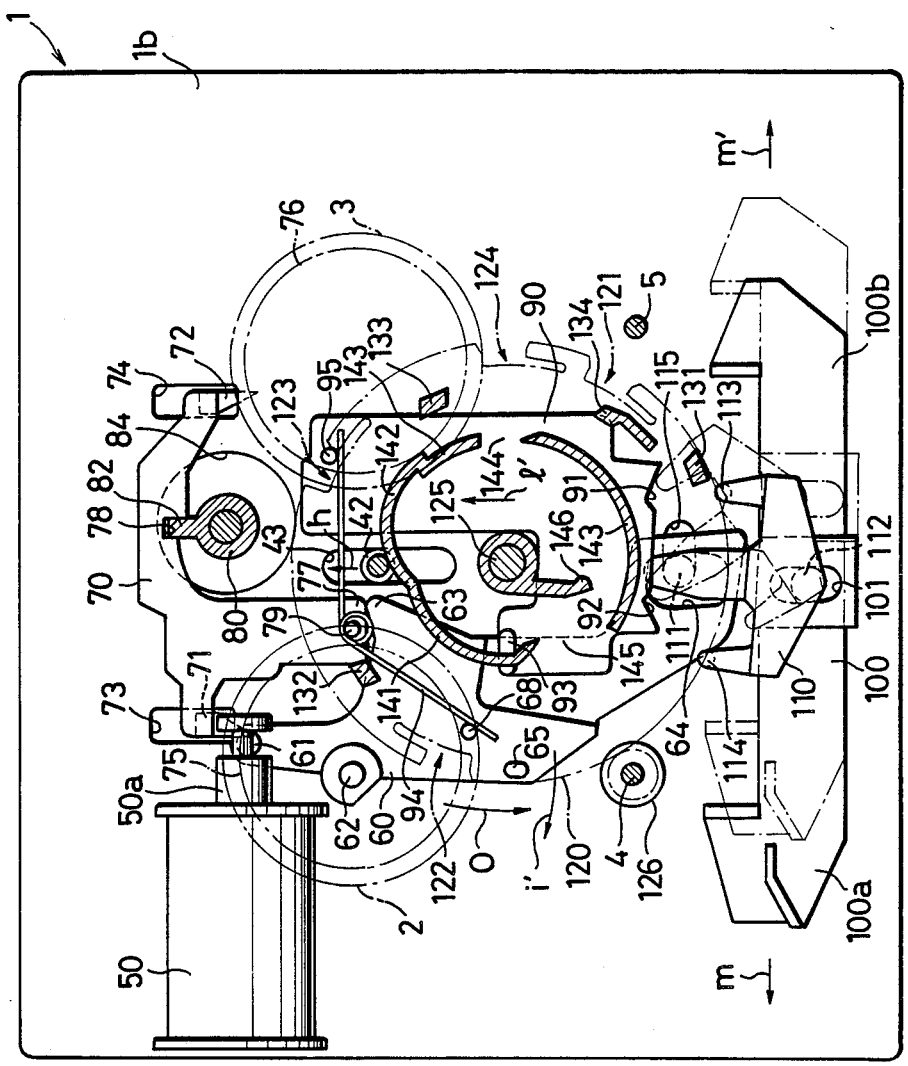
FIG. 10 is a bottom plan view in partial cross-section showing the principal elements of the mode-change mechanism of FIG. 9A in the forward or reverse drive modes.

As shown in FIG. 10, when "forward" or "reverse" is completed solenoid 50 is turned off and regulating lever 60 is moved to the return position in the direction of arrow i'. When gear 120 is further rotated projection 93 of slider 90 is disengaged from projection portion 146 of gear 120, as shown in FIG. 10. Therefore, selective slider 90 is moved to the return position in the direction of arrow 1'.

Figure 11A:
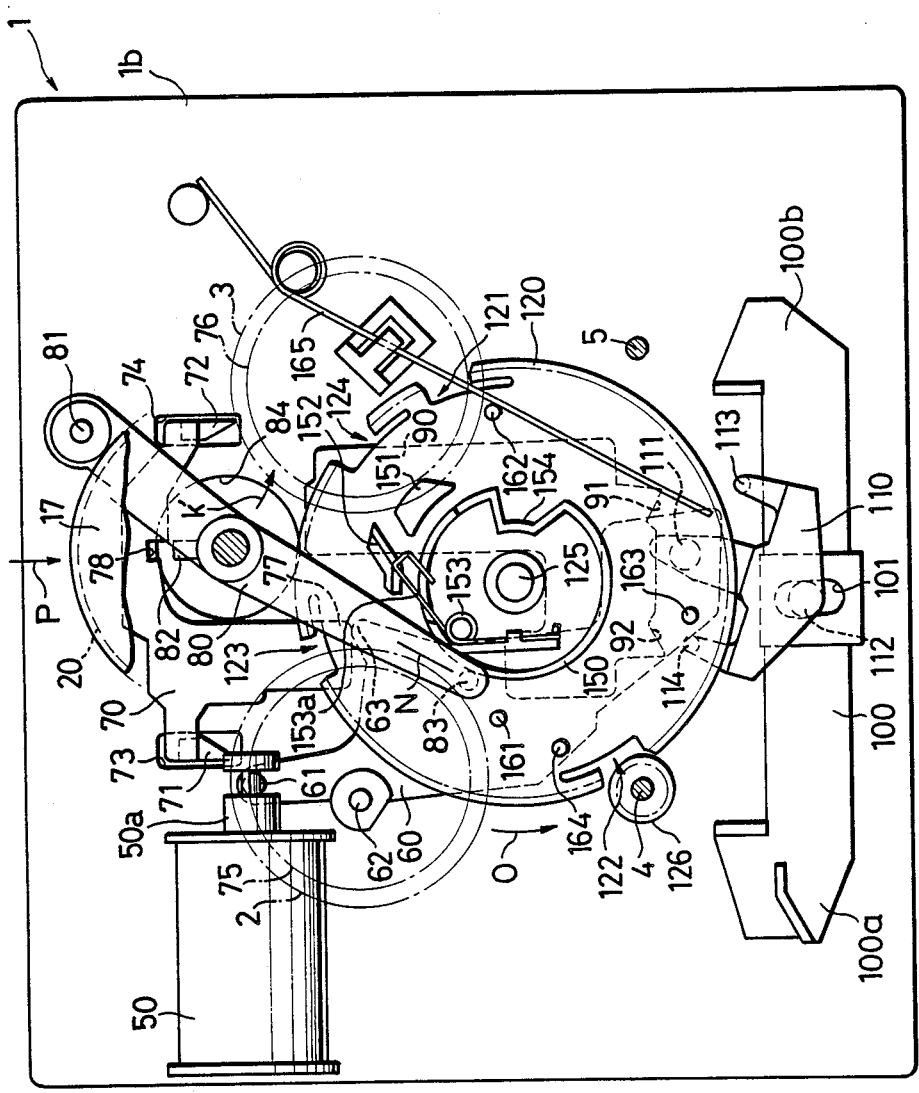
FIG. 11A is a bottom plan view showing the principal elements of the mode-change mechanism of FIG. 5 in the reproducing or recording mode.
Figure 11B:
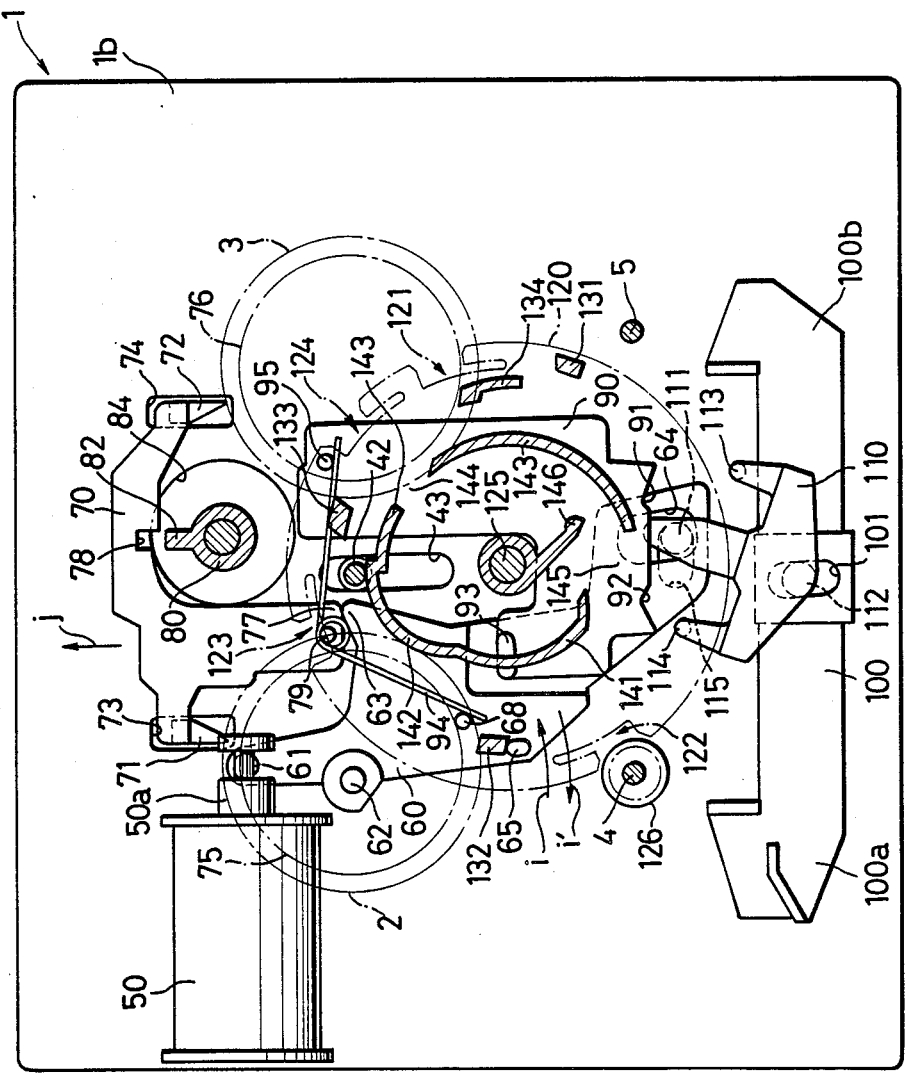
FIG. 11B is a bottom plan view in partial cross-section showing the principal elements of the mode-change mechanism of FIG. 11A.

Referring to FIGS. 3, 4, and 10 to 11B, a mode change operation to the recording/reproducing mode will be described. First because gear 120 has been subsequently rotated in the direction of arrow o after selection of "forward" or "reverse" is completed, as described above, drive pin 42 of head base plate 40 is led by second cam 142 and head baseplate 40 is moved to the advanced position in the direction of arrow h, as shown in FIG. 10. If solenoid 50 is turned "on", as shown in FIG. 11B, regulating lever 60 is moved to the advanced position in the direction of arrow i and, as a result, second locking projection 132 of gear 120 abuts locking projection 65, so that gear 120 is locked in a position where the second toothless peripheral portion 122 thereof is in opposed relation to driving gear 126. At the same time, because pressed portion 77 of brake member 70 is pressed by presser arm 63 of regulating lever 60, brake member 70 is moved to the advanced position in the direction of arrow j by regulating lever 60. Therefore, engagement portions 71 and 72 are disengaged from teeth 75 and 76 of reel bases 2 and 3, respectively, and reel bases 2 and 3 are released.

In this case, as shown in FIG. 11A, though engagement recess 78 of brake member 70 is disengaged from engagement projection 82 of FR change lever 80, and FR change lever 80 becomes free to pivot, FR change lever 80 is biased in the direction of arrow K' by force P generated by the elasticity of drive belt 20 that is wound around FR pulley 17. Therefore, pin 83 of FR change lever 80 is pressed against the cam profile of cam 150 of gear 120 and FR change lever 80 is held in the neutral position N as before.

As shown in FIG. 11B, drive pin 42 of head baseplate 40 is led by second cam 142 of gear 120 and head baseplate 40 is moved completely to the advanced position in the direction of arrow h, so that magnetic head 8 is brought into complete contact with magnetic tape 13.

Although not shown in the drawings, as R driver 25 and pinch roller 7 are restrained by other end 100b of changeover slider 100 positioned in the forward position, only F driver 24 and pinch roller 6 are moved to advanced positions by the function of the one end 40a of the head baseplate 40. As a result, the forward direction recording/reproducing mode is obtained, as described hereinabove.

Similarly, although not shown in the drawings when changeover slider 100 is located in the reverse position, F driver 24 and pinch roller 6 are restrained by one end 100a of changeover slider 100, so that only R driver 25 and pinch roller 7 are moved to the advanced positions by the other end 40b of head baseplate 40. Thus, the reverse direction recording/reproducing mode is obtained.

As described above and as shown in FIGS. 3 and 4, the recording/reproducing mode is set after "forward" or "reverse" is selected at the first branch point A.

Referring to FIGS. 3, 4, and 11A to 12B, the operation for providing a search mode will be described. First, if solenoid 50 is turned "off" during the state of the forward or reverse recording/reproducing mode, plunger 50a extends outwardly so that regulating lever 60 is moved to the return position in the direction of arrow i' in FIG. 11B, and locking projection 65 of regulating lever 60 is unlocked from second locking projection 132 of gear 120. Then, in FIG. 11A, second spring stop 162 of gear 120 is pressed by the arm of coiled torsion spring 165 and gear 120, which is urged due to an initial torque given by the spring 165, is meshed with driving gear 126. Thus, partially toothless peripheral gear 120, which includes the cams on both flat surfaces, is rotated in the direction of arrow o. After unlocking by turning "off" solenoid 50, a fourth branch point D is reached. In the fourth branch point D, either a non-search mode or a search mode can be selected by turning "on" or "off" the solenoid 50, as shown in FIGS. 3 and 4.

Figure 12A:
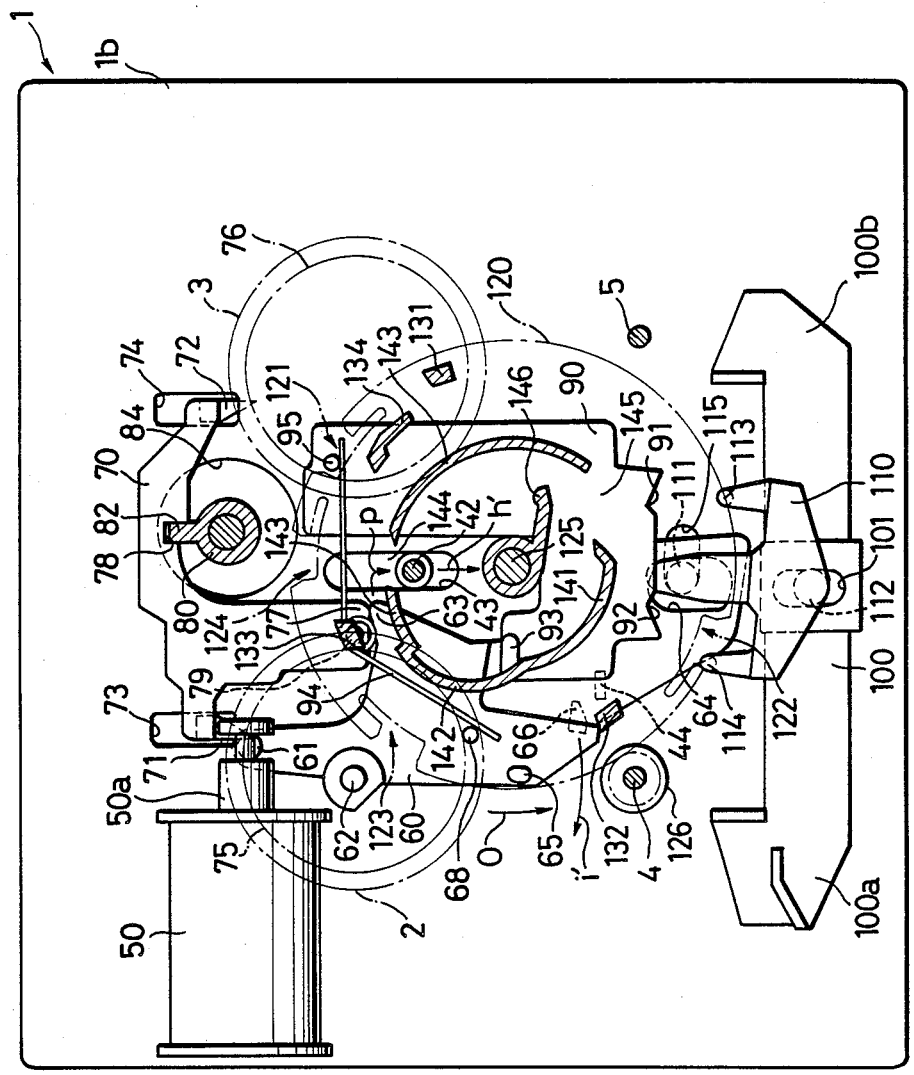
FIG. 12A is a bottom plan view in partial cross-section showing the principal elements of the mode-change mechanism of FIG. 5 when a search mode has not been selected.

That is, if the non-search mode is commanded at the fourth branch point D, solenoid 50 is kept "off" after unlocking, and regulating lever 60 is moved to the return position in the direction of arrow i', as shown in FIG. 12A. As a result, as shown in FIG. 12B, projection 66 of regulating lever 60 is disengaged from projection 44 of head baseplate 40.

Thus, gear 120 is rotated in the direction of arrow o and drive pin 42 of head baseplate 40 is moved along the cam profile of third cam 143. Then, drive pin 42 of head baseplate 40 reaches gap 144 disposed in the third cam 143 and it drops through gap 144, as indicated by arrow p, and head baseplate 40 is moved to the return position in the direction of arrow h'.

Thereby, magnetic head 8 is completely separated from magnetic tape 13 and F driver 24 and pinch roller 6, or R driver 25 and pinch roller 7, in the advanced position are also moved to the return position, as head baseplate 40 is moved to the return position.

Figure 12B:
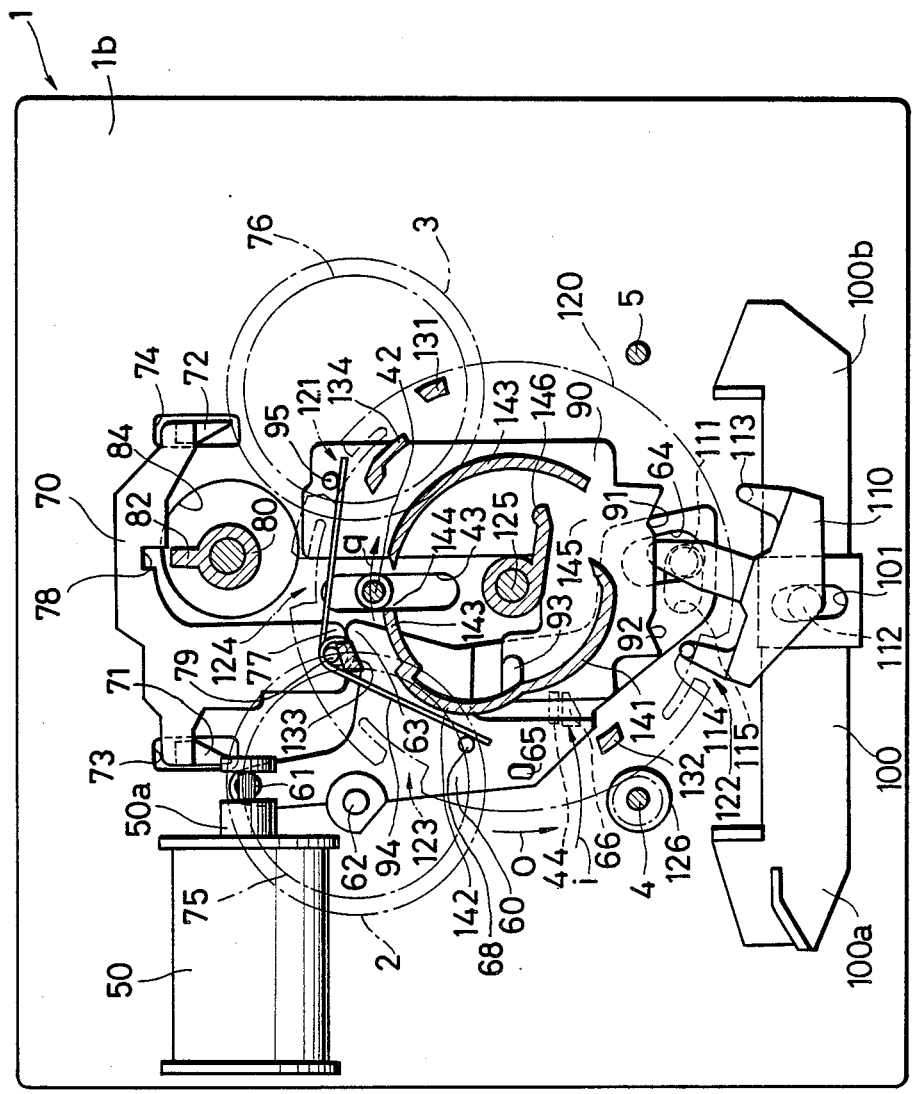
FIG. 12B is a bottom plan view in partial cross-section showing the principal elements of the mode-change mechanism of FIG. 12A at a time when the search mode is selected.
Figure 13:
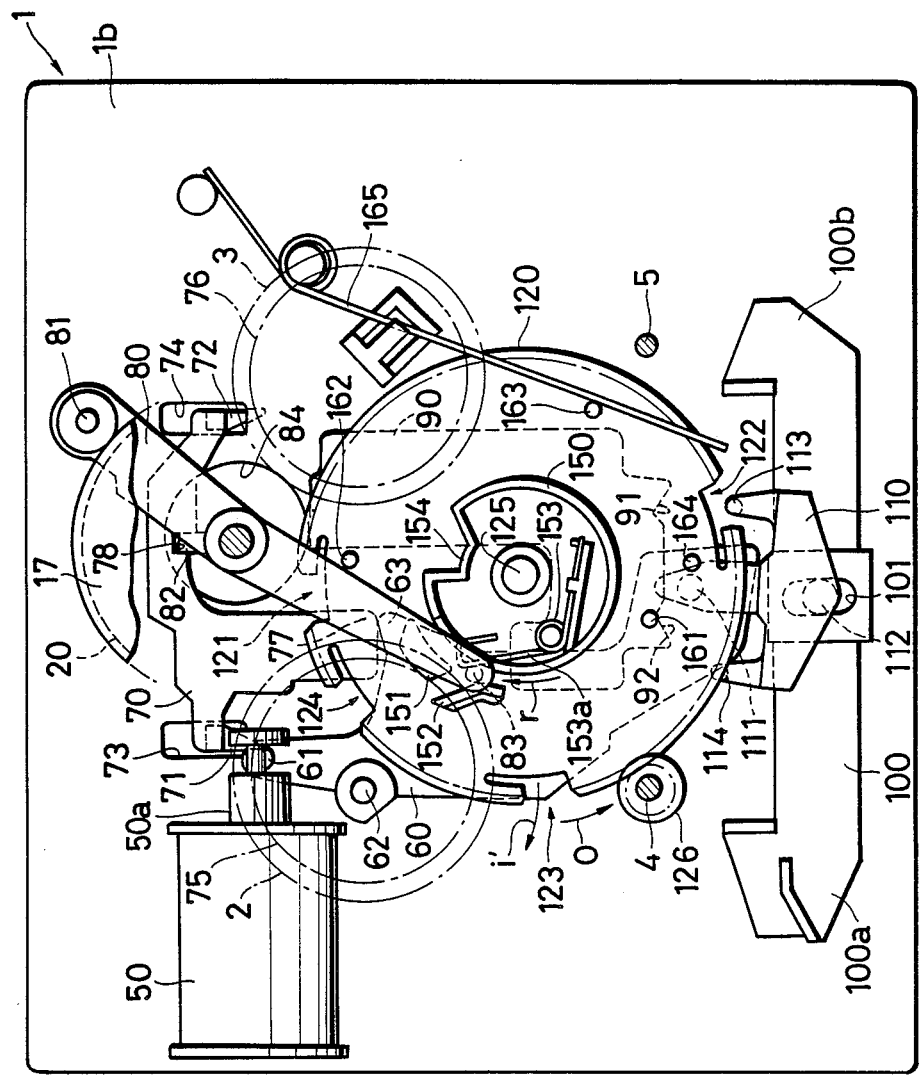
FIG. 13 is a bottom plan view showing the principal elements of the mode-change mechanism of FIG. 5 when a fast forward mode is selected.

Next, if the search mode is commanded at the fourth branch point D, solenoid 50 is turned "on" after unlocking has been performed by turning it "off." As a result, as shown in FIG. 12B, regulating lever 60 is moved to the advanced position in the direction of arrow i, and projection 66 of the regulating lever 60 is engaged with projection 44 of head baseplate 40.

Therefore, even if drive pin 42 of head baseplate 40 reaches gap 144 in third cam 143, it does not drop therethrough and it subsequently moves along third cam 143 in the direction of arrow q, because projection 44 of head baseplate 40 is restained by the projection 66 of regulating lever 60. Thereby, head baseplate 40 is slightly moved to the return-position in the direction of arrow h' and held, so that magnetic head 8 is brought into light contact with magnetic tape 13 to perform the search mode.

As described above, as gear 120 is rotated magnetic head 8 is selectively brought into contact with or separated from magnetic tape 13 by the turning "on" or "off" of solenoid 50 at the fourth branch point D and, thereafter, solenoid 50 is turned "off."

Referring to FIGS. 3, 4, and 13 to 14C, the operation of changing to a fast forward mode will be described. First, after the non-search or search mode is selected as described above, gear 120 has been subsequently rotated in the direction of arrow o so that pin 83 of FR change lever 80 enters between cam 150 and cam 152, as indicated by arrow r in FIG. 132, and there is provided a second branch point B. In the second branch point B, one of two states, either changed or not changed to the fast forward mode, is selected by turning "on" or "off" solenoid 50, as shown in FIGS. 3 and 4. When the fast forward mode is commanded, solenoid 50 is turned "on" and regulating lever 60 is moved to the advanced position in the direction of arrow i in FIG. 14A, so that pressed surface 77 of brake member 70 is pressed to the advanced position in the direction of arrow j by presser arm 63 of regulating lever 60. As a result, because engagement recess 78 of brake member 70 is disengaged from engagement projection 82 of FR change lever 80, FR changer lever 80 becomes free to pivot. When pin 83 of FR change lever 80 enters between cam projections 152 and 150, pin 83 is selectively led to first cam passageway, shown at arrow s, by the force of spring 153 and then reaches the outside of cam 151. Therefore, FR change lever 80 is pivoted in the direction of arrow k and, hence, FR driver 31 that is supported by FR change lever 80 is engaged with idler gear 30.

Figure 14A:
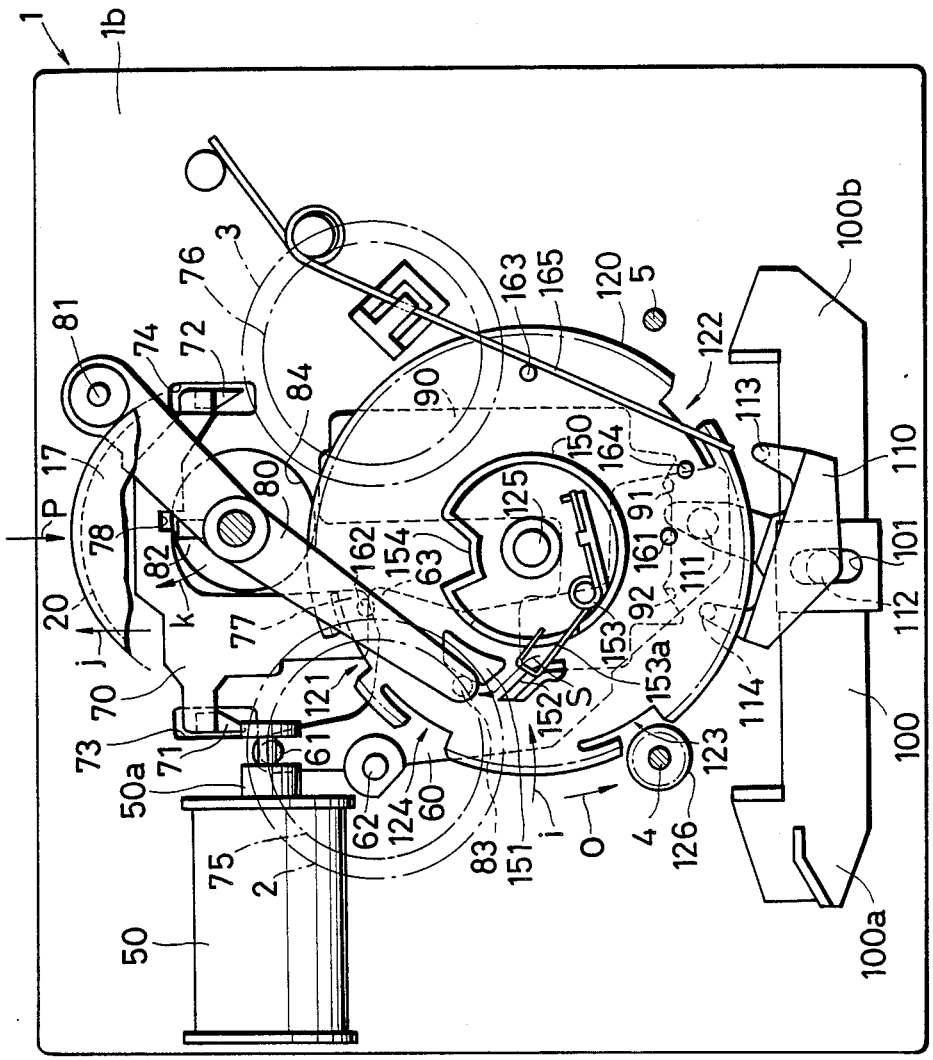
FIG. 14A is a bottom plan view showing the principal elements of the mode-change mechanism of FIG. 13 in the fast forward mode.
Figure 14B:
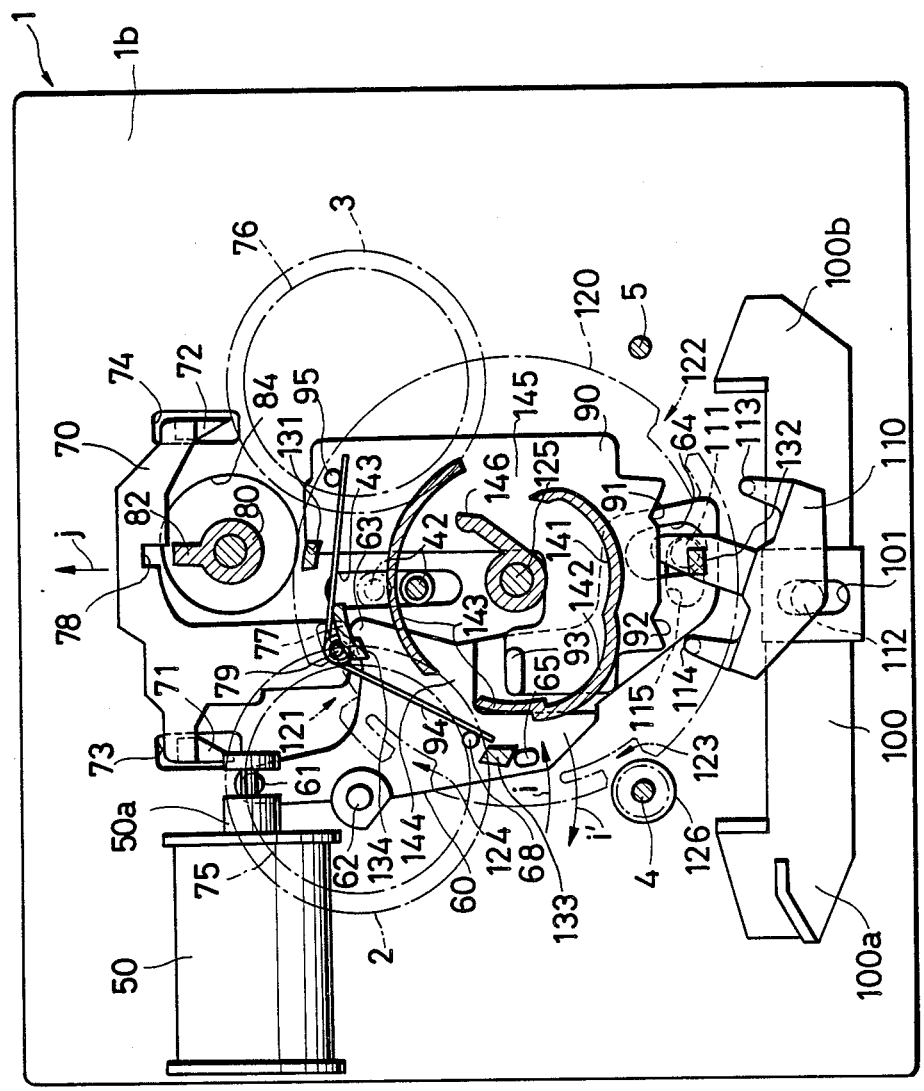
FIG. 14B a bottom plan view in partial cross-section showing the principal elements of the mode-change mechanism 14A.

As regulating lever 60 has been moved to the advanced position in the direction of arrow i shown in FIG. 14B by turning "on" solenoid 50, third locking projection 133 of gear 120 abuts locking projection 65, and gear 120 is locked in the position where third toothless peripheral portion 123 is in opposed relation to driving gear 126. Thus, the fast forward mode is obtained as described hereinabove.

Figure 14C:
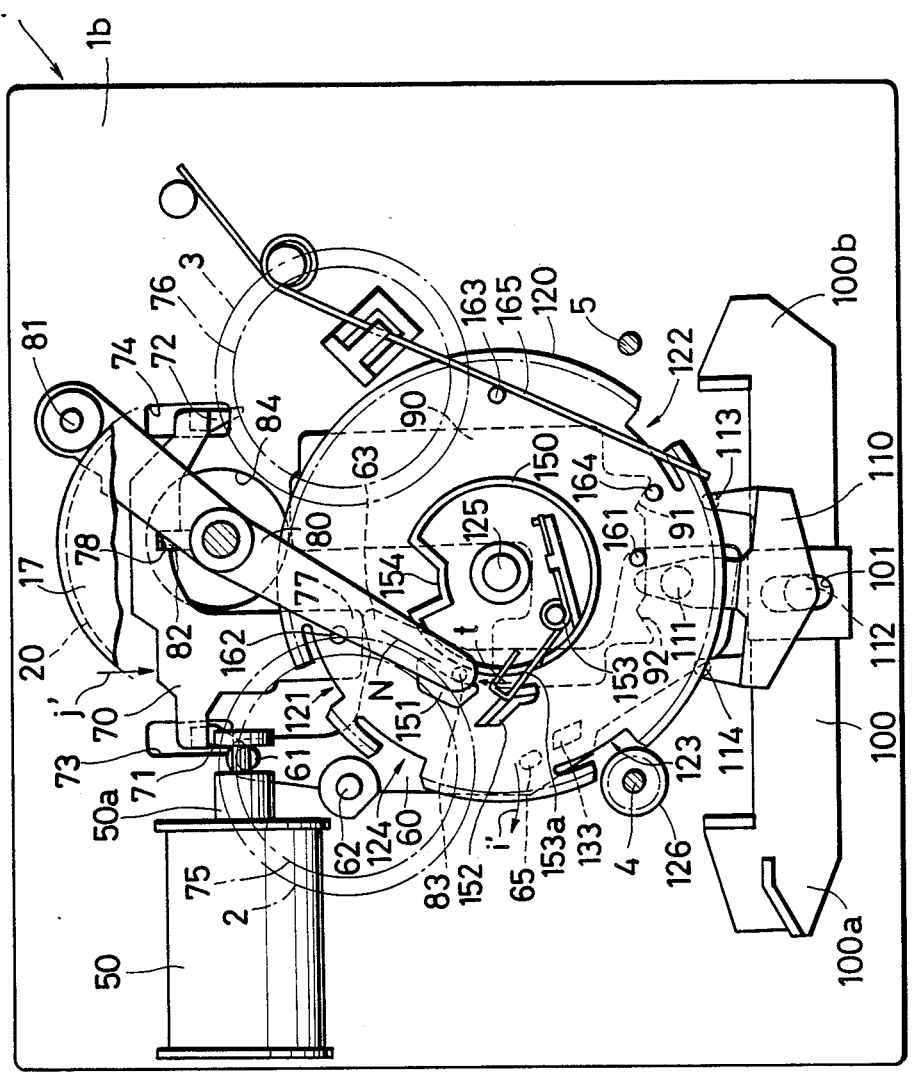
FIG. 14C a plan view showing the principal elements of the mode-change mechanism of FIG. 13 when the fast forward mode has not been selected.

When the fast forward mode is not commanded, solenoid 50 is turned "off." In FIG. 14C, as the brake member 70 has also been moved to the return position in the direction of arrow j' by the return of regulating lever 60 in the direction of arrow i', engagement recess 78 is engaged with engagement projection 82 of FR change lever 80 and FR change lever 80 is kept in the neutral position N. Therefore, pin 83 of FR change lever 80 is selectively led to second cam passageway, as shown at arrow t, between cams 150 and 151 against the force of spring 153, so that FR driver 31 is engaged with neither idler gear 30 nor reel base gear 23.

Furthermore, as solenoid 50 is turned "off" locking projection 65 of regulating lever 60 does not abut third locking projection 133, so that gear 120 is not locked, and the fast forward mode is not provided but is passed over.

Thus, as represented in FIGS. 3 and 4, one of the two states, changed or not changed to the fast forward mode, is selected at the second branch point B, so that the fast forward mode is either selected or not. If the fast forward mode is provided, as represented in FIG. 3, a forward fast forward mode, a forward fast-forward search mode, a reverse fast forward mode, or a reverse fast-forward search mode will be set by the selection of "forward" or "reverse" at the first branch point A, and the selection of the non-search mode or search mode at the fourth branch point D.

Referring to FIGS. 3, 4, and 14A to 15C, the operation for changing to a rewind mode is described, in which first solenoid 50 is turned "off" in the fast forward mode, and when the fast forward mode is passed, solenoid 50 remains "off". In FIG. 14B, regulating lever 60 is moved to the return position in the direction of arrow i', and locking portion 65 is unlocked from third locking projection 133. Therefore, in FIG. 14A, third spring stop 163 is pressed by the coiled torsion spring 165 and gear 120 is rotated due to an initial torque caused by spring 165 and is engaged with driving gear 126, so that gear 120, which includes the cams on both sides, is rotated in the direction of arrow o.

Figure 15A:
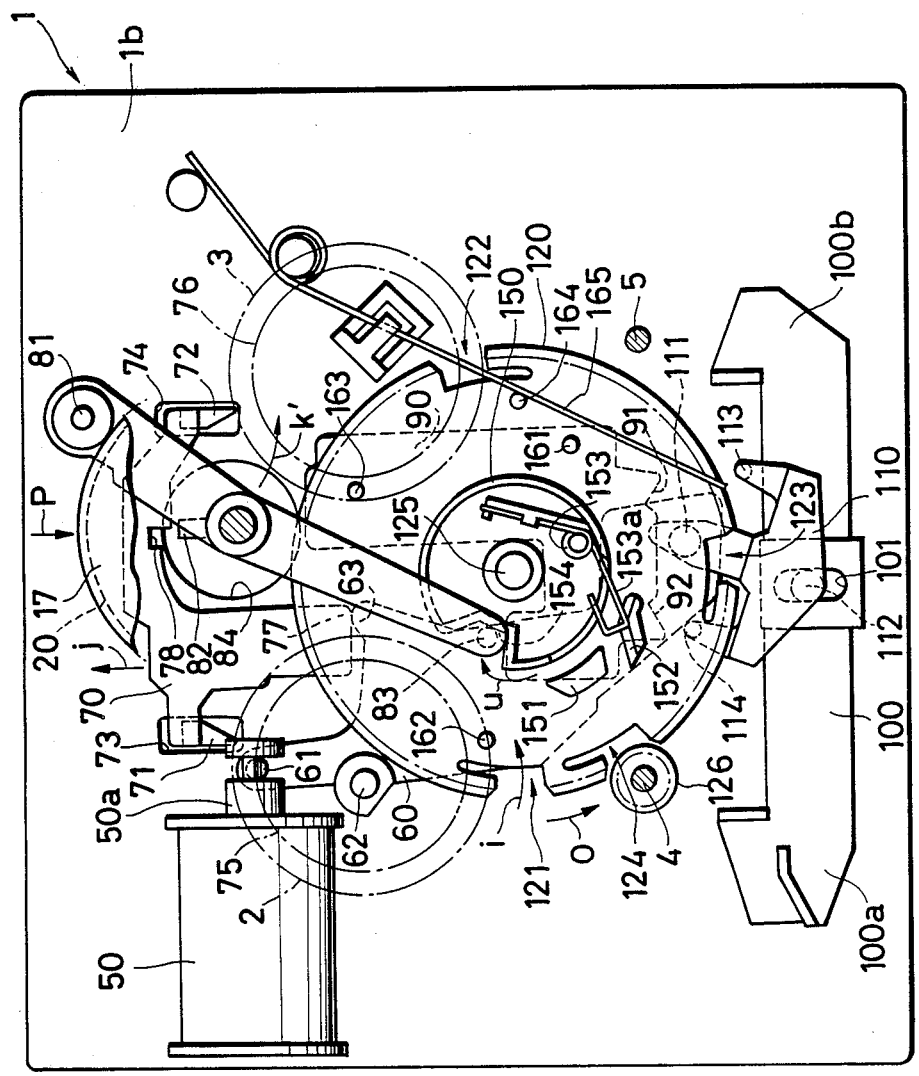
FIG. 15A is a bottom plan view showing the principal elements of the mode-change mechanism of FIG. 5 in the rewind mode.

After gear 120 is unlocked, a third branch point C is provided, as represented in FIGS. 3 and 4, in which a selection of one of two states, changed or not changed to the rewind mode, is performed by turning "on" or "off" solenoid 50. If the rewind mode is commanded, solenoid 50 is turned "on" and brake member 70 is moved to the advanced position in the direction of arrow j by regulating lever 60, as shown in FIG. 15A. Therefore, similar to the case described above, FR change lever 80 becomes free to pivot but it is pressed in the direction of arrow k' by the force P caused by the elasticity of drive belt 20 would around FR pulley 17. Pin 83 of FR change lever 80 is inserted into recess 154 of the cam profile of cam 150 upon rotation of gear 120, as indicated by arrow u, so that FR change lever 80 is pivoted in the direction of arrow k' and FR driver 31 is engaged with reel base gear 23.

Figure 15B:
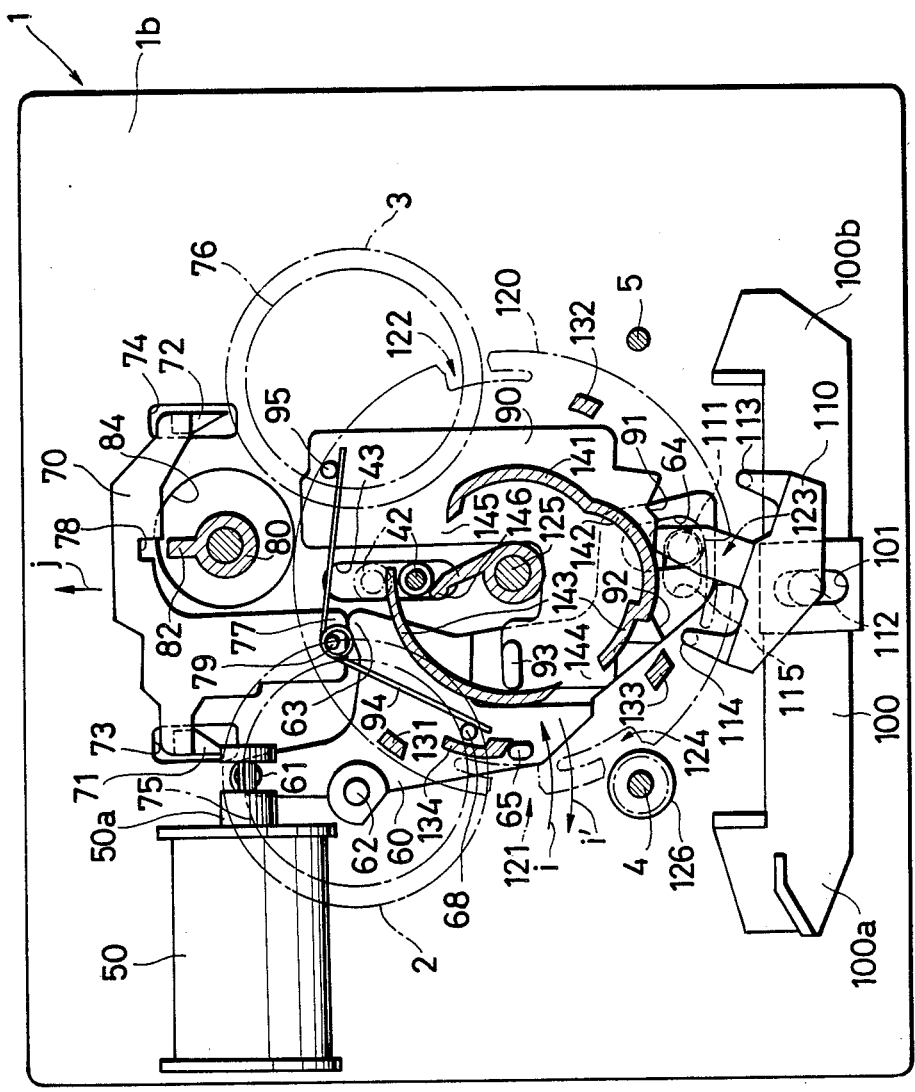
FIG. 15B is a bottom plan view in partial cross-section showing the principal elements of the mode-change mechanism of FIG. 15A.

As regulating lever 60 is moved to the advanced position in th direction of arrow i by turning "on" of solenoid operated means 50, as shown in FIG. 15B, fourth locking projection 134 abuts against locking projection 65. Therefore, gear 120 is locked in the state that fourth toothless peripheral portion 124 is in opposed relation to driving gear 126. Thus, the rewind mode is set as described above.

Figure 15C:
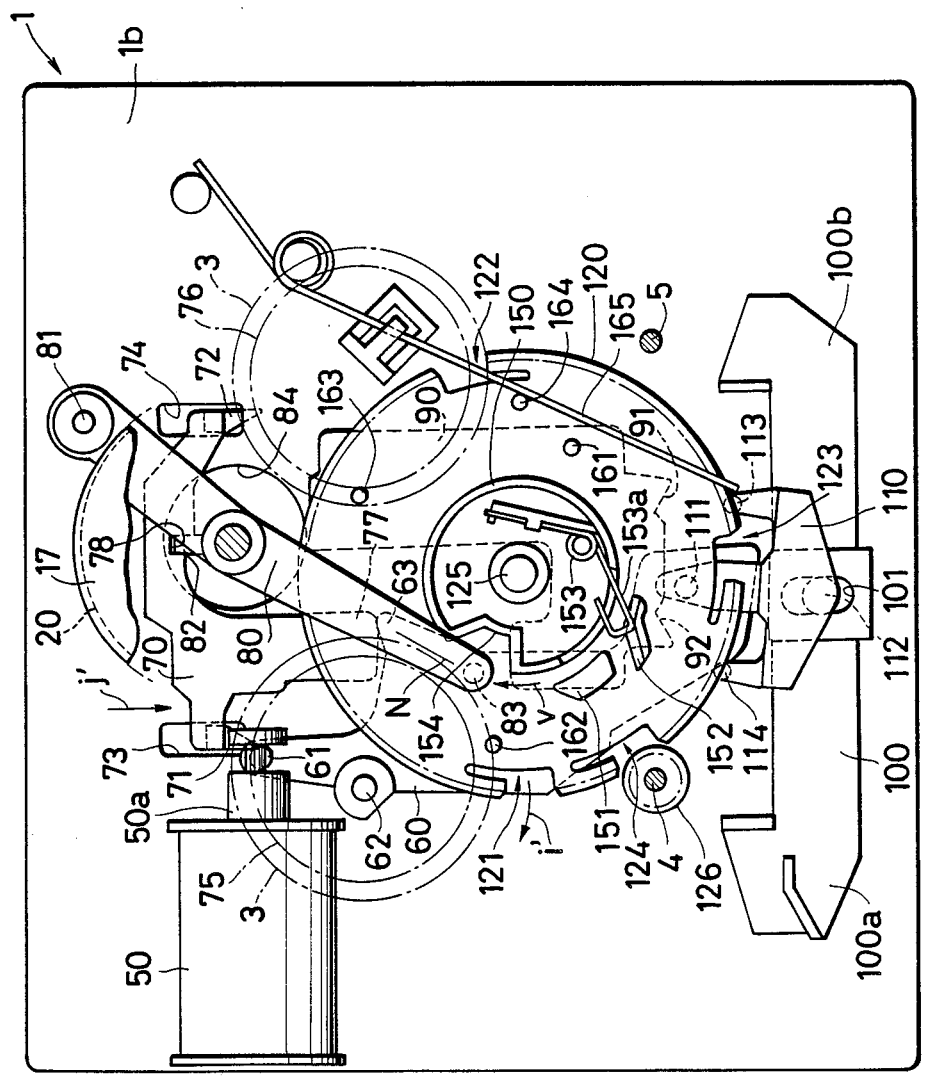
FIG. 15C is a bottom plan view showing the principal elements of the mode-change mechanism of FIG. 15A when the rewind mode has not been selected.

When the rewind mode is not commanded at the branch point C, solenoid 50 is turned "off" and, as shown in FIG. 15C, as brake member 70 has also been moved to the return position in th direction of arrow j' due to the return of regulating lever 60 in the direction of arrow i', change lever 80 has been held in the neutral position N.

Therefore, pin 83 of FR change lever 80 is not inserted in recess 154 of the cam profile of cam 150 but is moved as indicated by arrow v, so that FR driver 31 is engaged with neither idler gear 30 nor reel base gear 23, and as solenoid 50 is "off" locking projection 65 of regulating lever 60 does not abut fourth locking projection 134. Thus, gear 120, which has the cams on both sides, is not locked and the rewind mode is passed.

In the above manner, as represented in FIGS. 3 and 4, the selection of one of the two states, changed or not changed to the rewind mode, is performed at the third branch point C, so that the rewind mode or the state passing the rewind mode, is selectively provided. Thus, if the rewind mode is set as shown in FIG. 3, a rewind mode during "forward", a rewind search mode during "forward," a rewind mode during "reverse", or a rewind search mode during "reverse" will be provided by selecting "forward" or "reverse" at the first branch point A, and by selecting the non-search mode and the search mode at the fourth branch point D.

Upon switching to the fast forward mode or the rewind mode, FR change lever 80 and brake member 70 are each restrained by the help of engagement projection 82 and engagement recess 78. That is, FR change lever 80 is not pivoted unless brake member 70 is moved to the advanced position in the direction of arrow j in FIGS. 14A and 15A.

In other words, after reel bases 2 and 3 are disengaged from brake member 70 in order to be unlocked FR change lever 80, on which FR driver 31 is mounted, becomes free to pivot so that no noise is produced when FR driver 31 is engaged with idler gear 30 or with reel base gear 23.

In addition, in the state where FR change lever 80 is free to pivot, the return of brake member 70 is interrupted by engagement projection 82 on FR change lever 80, so that the situation does not occur in which reel bases 2 and 3 are restrained by brake member 70, while FR change lever 80 is free to pivot.

Furthermore, brake member 70 is not moved to the return position unless FR change lever 80 is returned to the neutral position N where engagement recess 78 of brake member 70 is engaged with engagement projection 82. In other words, reel bases 2 and 3 are engaged with brake member 70, after FR driver 31 is disengaged from idler gear 30 or reel base gear 23, so that no noise is produced when FR driver 31 is disengaged from idler gear 30 or reel base gear 23.

In addition, FR change lever 80 is driven by cam 150 and is pressed by force P caused by the elasticity of belt 20, which is wound around FR pulley 17 of FR change lever 80, so as to make pin 83 of FR change lever 80 resiliently abut against the profile of cam 150, so that belt 20 that transmits rotation of motor 18 to FR driver 31 can also press FR change lever 80. Therefore, a special biasing spring need not be provided for FR change lever 80.

When solenoid 50 is turned "off" during the rewind mode, regulating lever 60 is moved to the return position in the direction of arrow i' in FIG. 15B, and locking projection 65 is disengaged from fourth locking projection 134, fourth spring stop 164 of gear 120 is pressed by coiled torsion spring 165 and gear 120, which is rotated by an initial torque in the direction of arrow o, is engaged with driving gear 126. As a result gear 120 is rotated in the direction of arrow o, and the stop mode is set again upon turning "off" solenoid 50.

Although a preferred embodiment of the present invention has been described above, the present invention need not be limited to that particular embodiment but can be effectively modified to obtain advantageous results.

For example, in the above embodiment, the first branch point is provided between the first and second toothless portions of the partially toothless gear, however, the first branch point could also be provided between the second and third toothless portions, or between the third and fourth toothless portions, so that a forward tape drive state or a reverse tape drive state can be selected before the fast forward mode or the rewind mode is set.

Furthermore, this invention is applicable not only to the mode-change mechanism for an auto-reverse recording and/or reproducing apparatus using a compact tape cartridge, but also to mode-change mechanisms for other kinds of auto-reverse recording and/or reproducing apparatus.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. A mode-change mechanism for an auto-reverse recording and/or reproducing apparatus comprising:
a driving gear driven by a power source;
a partially toothless gear having cams formed on a flat surface thereof and being intermittently driven by said driving gear only in one direction, and having at least four toothless peripheral portions, a first toothless portion located in opposed relation to said driving gear at a time of forward recording-/reproducing mode and reverse recording/reproducing mode, a third toothless portion located in opposed relation to said driving gear at a time of one of a fast forward mode and a rewind mode, and a fourth toothless portion located in opposed relation to said driving gear at a time of the other of a fast forward mode and rewind mode, said cams being arranged for driving respective predetermined members, whereby said modes are provided;
biasing means for providing an initial torque to said partially toothless gear;
locking means for locking and unlocking said partially toothless gear in respective positions whereat each toothless portion is located in opposed relation to said driving gear;
solenoid means for regulating operation of said locking device;
selection means for selecting said modes when each toothless portion is located in opposed relation to said driving gear; and
selection control means for regulating said solenoid means to control said selection means while said partially toothless gear is rotated.

2. The mode-change mechanism according to claim 1, wherein said selection means comprises a first selector for selecting one of a forward mode and a reverse mode, and said selection control means comprises a first selector controller that controls said first selector while said partially toothless gear having cams formed thereon turns through an angle between said first toothless portion and said second toothless portion.

3. The mode-change mechanism according to claim 2, wherein said first selector comprises a changeover member and a first changeover controller for controlling said changeover member, said changeover member selecting moving directions of a forward/reverse changeover means and selectively locating said forward/reverse changeover means in a forward mode position or a reverse mode position thereof.

4. The mode-change mechanism according to claim 3, wherein said forward/reverse changeover means comprises means for turning a magnetic head through a predetermined angle in response to said forward mode or said reverse mode, means for selectively pressing one of a pair of pinch rollers against a corresponding one of a pair of capstans, and means for selectively meshing an idler gear with one of a pair of reel bases so as to drive said one of the pair of reel bases.

5. The mode-change mechanism according to claim 3, wherein said first control means is formed integrally with said locking device.

6. The mode-change mechanism according to claim 1, wherein said selection means comprises a second selector for selecting one of two modes corresponding to providing and not providing one of the fast forward mode and the rewind mode, respectively, and said selection control means comprises a second selector controller for controlling said second selector while said partially toothless gear turns through an angle between said second toothless portion and said third toothless portion.

7. The mode-change mechanism according to claim 6, further comprising a forward/reverse change lever to which an idler gear that selectively transmits a torque to one of said pair of reel bases is rotatably secured, said second selector comprising a first forward/reverse changeover means for locating said forward/reverse change lever in either of two positions corresponding to when said idler is engaged or not engaged, respectively, with one of the pair of reel bases.

8. The mode-change mechanism according to claim 7, wherein said first forward/reverse changeover means comprises cam means provided on said partially toothless gear, and having at least two cam passages branched in two directions to lead said forward/reverse change lever; a movable locking means for placing said forward/reverse change lever in either of a movable state and a fixed state; and a second controller means for controlling said movable locking means.

9. The mode-change mechanism according to claim 8, wherein said second controller is formed integrally with said locking device.

10. The mode-change mechanism according to claim 8, wherein said movable locking means is formed integrally with brake means for locking said pair of reel bases.

11. The mode-change mechanism according to claim 1, wherein said selection means comprises a third selector for selecting one of two modes corresponding to providing or not providing the other of the fast forward mode and the rewind mode, respectively, and said selection control means comprises a third selector controller for controlling said third selection mode at least while said partially toothless gear turns through an angle between said third toothless portion and said fourth toothless portion.

12. The mode-change mechanism according to claim 11, further comprising a forward/reverse change lever to which an idler gear for selectively transmitting a torque to one of said pair of reel bases is rotatably secured, and said third selector comprising a second forward/reverse changeover means for locating said forward/reverse change lever in either of two positions corresponding to when said idler is engaged or not engaged with one of said pair of reel bases, respectively.

13. The mode-change mechanism according to claim 12, wherein said second forward/reverse changeover means comprises cam means formed on a flat surface of said partially toothless gear and having at least two cam passages branched in two directions for leading said forward/reverse change lever; a movable locking means for placing said forward/reverse change lever in either of a movable state and a fixed state; and a third control means for controlling said movable locking means.

14. The mode-change mechanism according to claim 13, wherein said third control means is formed integrally with said locking device.

15. The mode-change mechanism according to claim 13, wherein said movable locking means is formed integrally with brake means for locking said pair of reel bases.

16. The mode-change mechanism according to claim 1, wherein said selection means comprises a fourth selector for selecting one of two modes corresponding to providing or not providing a search mode, and said selection control means comprises a fourth selector controller for controlling said fourth control means while said partially toothless gear turns through an angle between said second toothless portion and said third toothless portion.

17. The mode-change mechanism according to claim 16, wherein said selection means comprises a second selector for selecting one of two modes corresponding to providing and not providing one of the fast forward mode and the rewind mode, respectively, and said selection control means comprises a second selector controller for controlling said second selector while said partially toothless gear turn through an angle between said second toothless portion and said third toothless portion and said fourth selector controller controls said fourth selector before said second selector means is controlled by said second selection control means.

18. The mode-change mechanism according to claim 17, further comprising a movable head base means for conveying a magnetic head to a stop position where said magnetic head is separated from a magnetic tape, to a recording/reproducing position where said magnetic head is in contact with said magnetic tape, and to a search position where said magnetic head is midway between said stop position and said recording/reproducing position, said fourth selection means comprising a forward/reverse search changeover means for selectively locating said head base means in one of three positions corresponding to said searching position, said stop position, and said recording/reproducing position.

19. The mode-change mechanism according to claim 18, wherein said search changeover means comprises cam means formed on said partially toothless gear, and having at least two cam passages branched in two directions to lead said head base means and further comprising biasing means for urging said head base means to said stop position or to said recording/reproducing position.

20. A mode-change mechanism for an auto-reverse recording and/or reproducing apparatus comprising:
a driving gear driven by a power source;
a partially toothless gear having cams formed thereon and being intermittently driven by said driving gear only in one direction, and having at least four toothless peripheral portions, including a first toothless portion located in opposed relation to said driving gear during a stop mode, a second toothless portion located in opposed relation to said driving gear during a forward recording/reproducing mode and a reverse recording/reproducing mode, a third toothless portion located in opposed relation to said driving gear during one of a fast-forward mode and rewind mode, and a fourth toothless portion located in opposed relation to said driving gear during the other of a fast-forward mode and rewind mode, one of said cams being arranged for leading a movable head base means for moving a magnetic head to a stop position, wherein said magnetic head is separated from a magnetic tape, to a recording/reproducing position, wherein said magnetic head is in contact with said magnetic tape, and to a search position midway between said stop position and said recording/reproducing position, a presser element for pressing movable forward/reverse changeover means selectively located in a forward mode position and in a reverse mode position, and a forward/reverse cam for leading a forward/reverse change lever to which an idler for transmits a torque to a pair of reel bases is rotatably secured;
trigger means for providing an initial torque to said partially toothless gear;
locking means for locking and unlocking said partially toothless gear in respective positions wherein each toothless portion is located in opposed relation to said driving gear;
solenoid means for operating said locking device;
selection means for selecting modes in which each toothless portion is located in opposed relation to said driving gear; and
selection control means controlling said solenoid means so as to control said selection means while said partially toothless gear is rotated.

21. The mode-change mechanism according to claim 20, wherein said locking device includes at least four lock projections formed on said partially toothless gear for locking said partially toothless gear.

22. The mode-change mechanism according to claim 20, wherein said trigger means comprises a trigger spring for supplying said initial torque to said partially toothless gear, and at least four elements formed on said partially toothless gear for contact by said trigger spring.

23. The mode-change mechanism according to claim 20, wherein said cam for leading said movable head base means comprises a first cam portion for leading said movable head base means from said stop position to said recording/reproducing position, a second cam portion for holding said movable head base means in said recording/reproducing position, and a third cam portion for holding said movable head base means in said search position.

24. The mode-change mechanism according to claim 23, wherein a gap is formed in said cams for causing said movable head base means to select one of two positions corresponding to where said search is performed or not performed, respectively.

25. The mode-change mechanism according to claim 20, wherein said forward/reverse cam for leading said forward/reverse change lever comprises a first forward/reverse cam portion for leading said forward/reverse change lever to a first engagement position where said torque is transmitted from said idler to one of said pair of reel bases, a second forward/reverse cam portion for leading said forward/reverse change lever to a second engagement position where said torque is transmitted from said idler gear to the other of said pair of reel bases, and a third cam portion for leading said forward/reverse change lever to a neutral position where said idler gear is disengaged from both of said pair of reel bases.

26. The mode-change mechanism according to claim 20, wherein said partially toothless gear has formed on one face thereof said presser elements for pressing said movable forward/reverse changeover means and said cam for leading said movable head base means, and has formed on the other face thereof said foreward/reverse cam for leading said forward/reverse change lever.

* * * * *